United States Patent [19]

Kuroshima et al.

[11] Patent Number: 5,500,923
[45] Date of Patent: Mar. 19, 1996

[54] IMAGE PROCESSING APPARATUS UTILIZING THE JBIG METHOD, HAVING A COMPRESSION/EXPANSION CIRCUIT TO MANAGE MEMORY MORE EFFECTIVELY

[75] Inventors: Masashi Kuroshima, Yokohama; Hiroyuki Hara, Kawasaki; Haruo Machida, Yokohama, all of Japan

[73] Assignee: Canon Kabushiki Kaisha, Tokyo, Japan

[21] Appl. No.: 21,112

[22] Filed: Feb. 23, 1993

[30] Foreign Application Priority Data

| Feb. 28, 1992 | [JP] | Japan | 4-043843 |
| Feb. 28, 1992 | [JP] | Japan | 4-043844 |
| Feb. 28, 1992 | [JP] | Japan | 4-043882 |

[51] Int. Cl.$^6$ ............................................ H04N 1/00
[52] U.S. Cl. ................................................ 395/114
[58] Field of Search ........................ 395/102, 114, 395/128, 139; 358/451, 444, 467, 539

[56] References Cited

U.S. PATENT DOCUMENTS

| 4,969,051 | 11/1990 | Sasaki | 358/447 |
| 5,091,782 | 2/1992 | Krause et al. | 358/467 |
| 5,148,497 | 9/1992 | Pentland et al. | 395/128 |
| 5,204,756 | 4/1993 | Chevion et al. | 358/467 |
| 5,204,959 | 4/1993 | Sakuraqi | 395/102 |
| 5,294,996 | 3/1994 | Sobue | 358/467 |
| 5,299,028 | 3/1994 | Kwarta | 358/451 |
| 5,363,206 | 11/1994 | Fukushima | 358/444 |

FOREIGN PATENT DOCUMENTS 0411232  2/1991  European Pat. Off. .
1126073  5/1989  Japan .

OTHER PUBLICATIONS

David L. Neuhoff, perceptual coding of Images for Halftone Display, Jul. 1991, pp. 2797–2800.

David L. Neuhoff, perceptual coding of Images for Halftone Display, Oct. 1, 1991, pp. 341–354.

IEEE Trans. On Communications, Burt P. J., "The Laplacian Pyramid as a Compact Image Code", vol. 31, No. 4, Apr. 1983, pp. 532–540.

Signal Process., Image Communication, Hampel H. et al., "Technical features of the JBIG standard for progressive bi–level image progression", vol. 4, No. 2, Apr. 1992, pp. 103–111.

*Primary Examiner*—Mark R. Powell
*Assistant Examiner*—Gabriel I. Garcia
*Attorney, Agent, or Firm*—Fitzpatrick, Cella, Harper & Scinto

[57] ABSTRACT

An image processing apparatus stores image data by compressing the image data in succession to a predetermined resolution, comparing the data before compression and the data after compression at each stage of the compressions to generate encoded data, and storing thus compressed image data and a plurality of thus generated encoded data in a memory. For image display or image output, the image data of a resolution required for such image display are prepared from the compressed image data and the encoded data stored in the memory. Thus conversion of image data from the original resolution to the resolution required in the display can be dispensed with.

11 Claims, 39 Drawing Sheets

FIG. 14
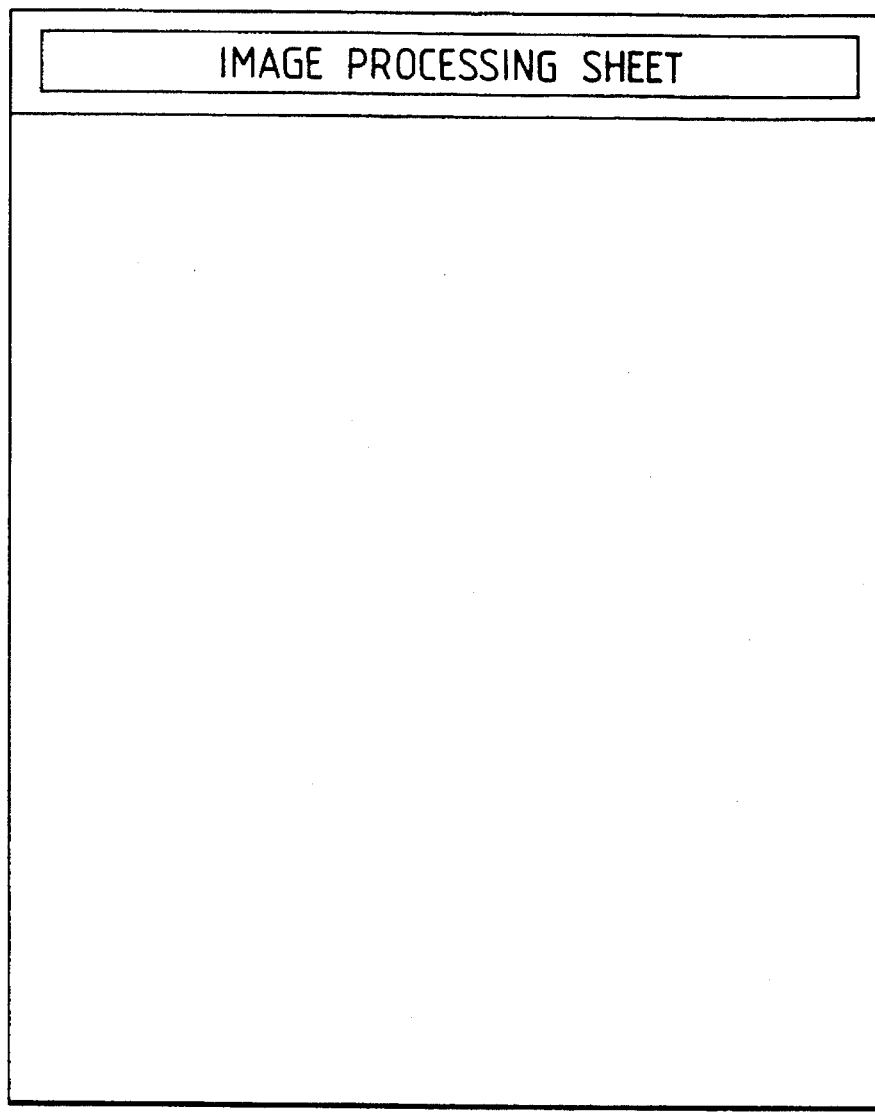
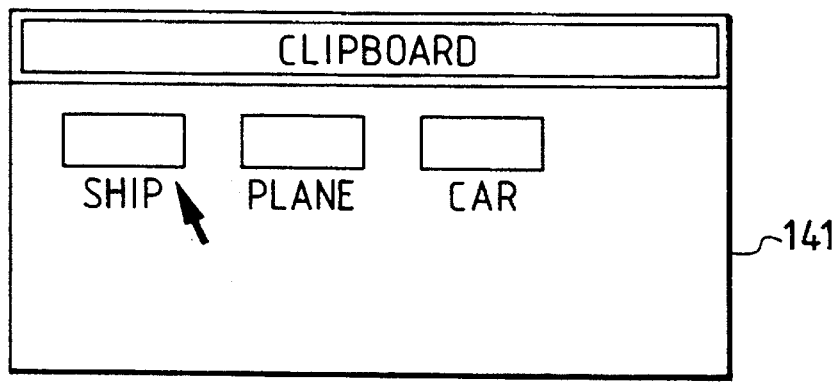

FIG. 15
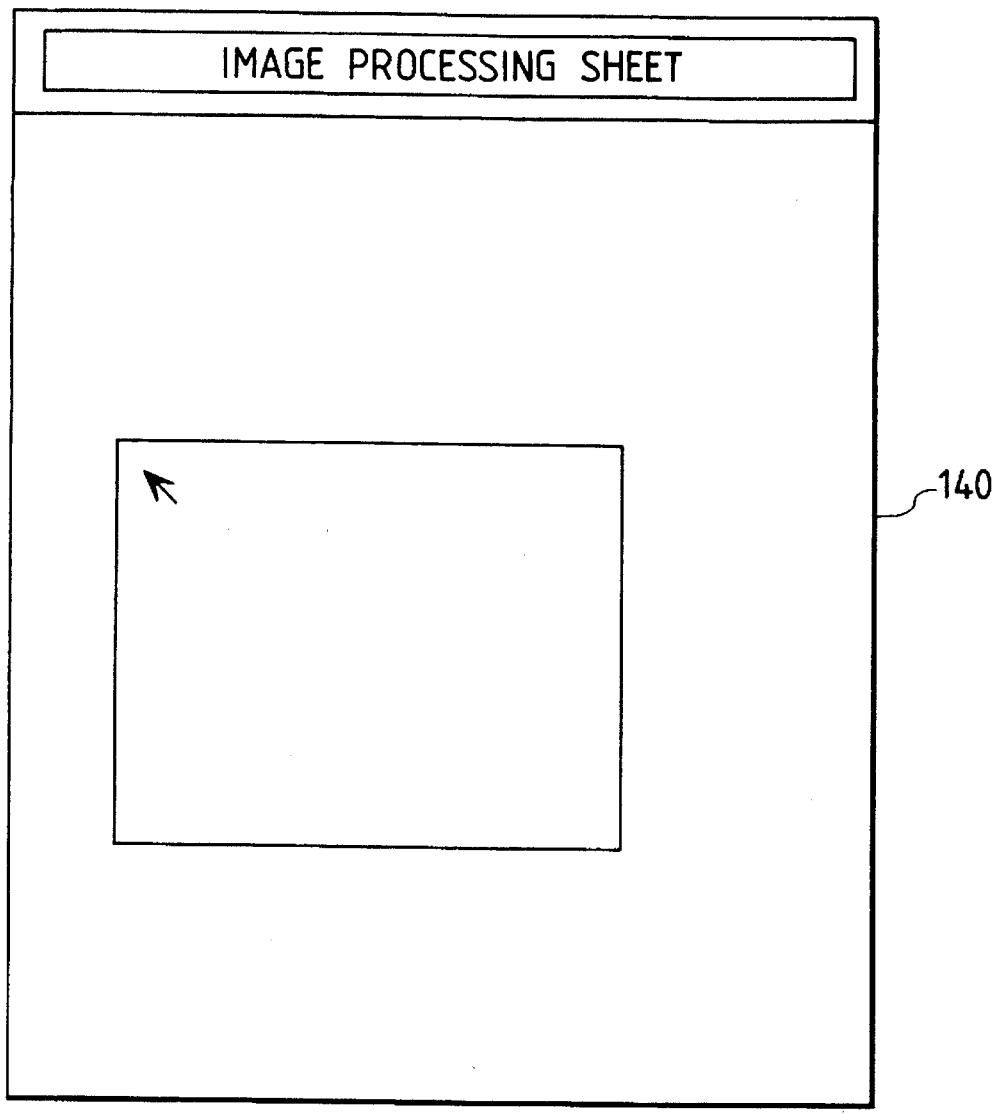
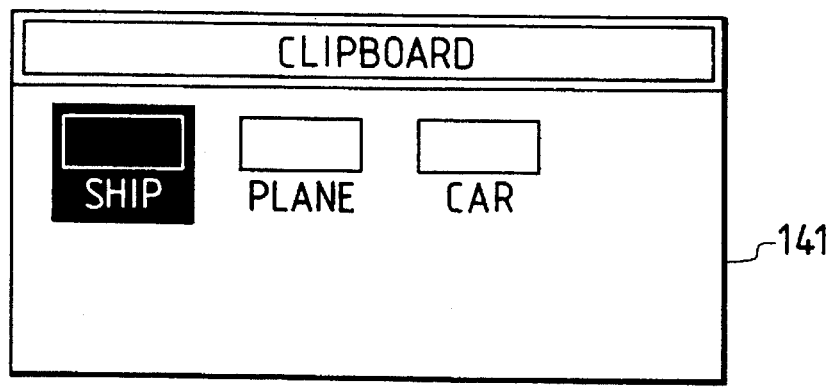

FIG. 16
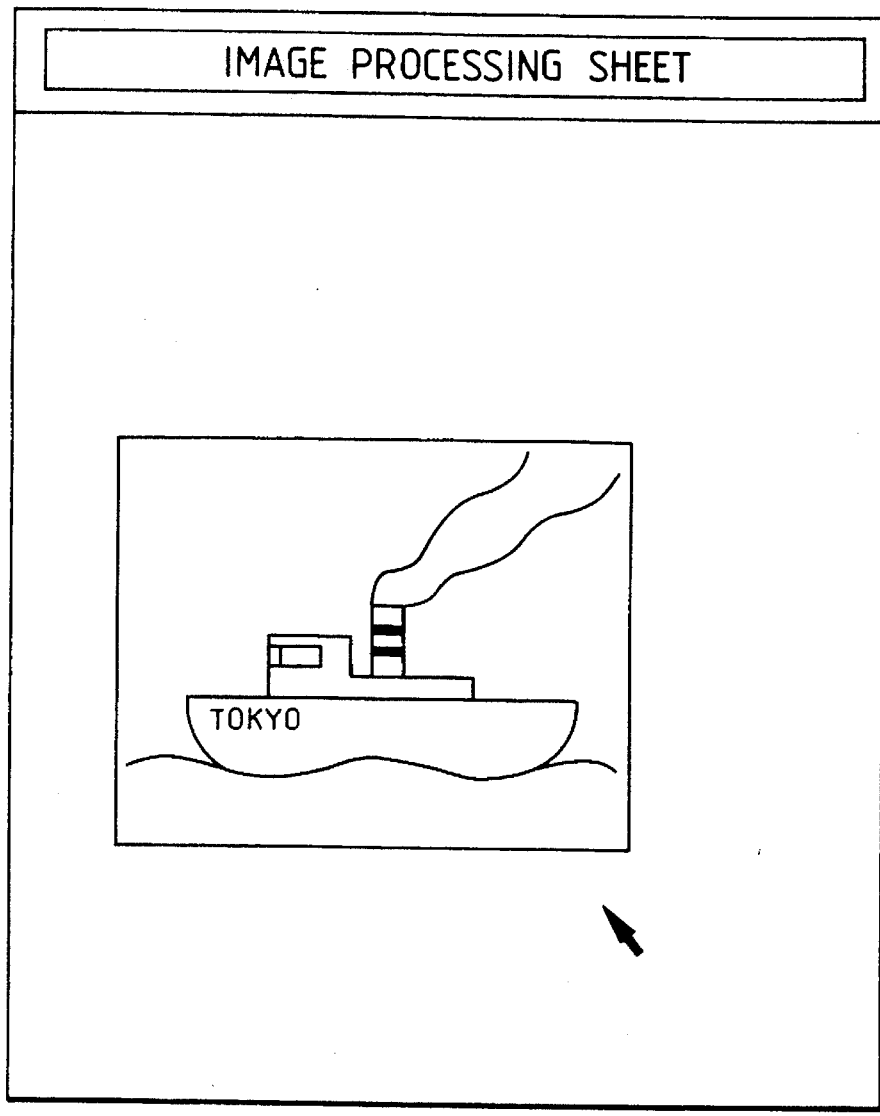
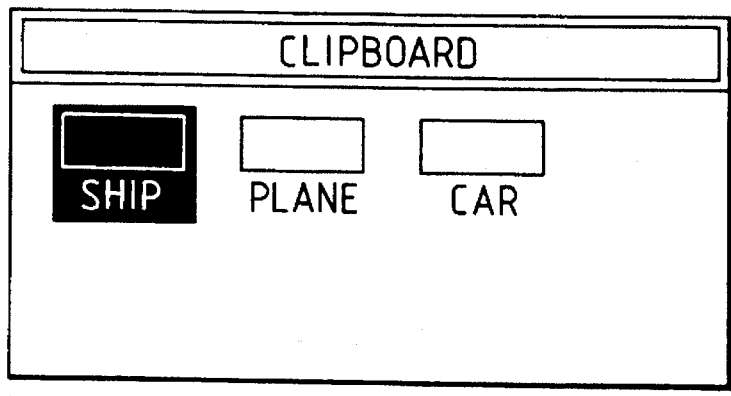

< 25 DPI IMAGE >

< 100 DPI IMAGE >

| 1 |   |   |   | 2 |   |   |   |
|---|---|---|---|---|---|---|---|
|   |   |   |   |   |   |   |   |
|   |   |   |   |   |   |   |   |
|   |   |   |   |   |   |   |   |
| 3 |   |   |   | 4 |   |   |   |
|   |   |   |   |   |   |   |   |
|   |   |   |   |   |   |   |   |
|   |   |   |   |   |   |   |   |

< 25 DPI IMAGE >

< 100 DPI IMAGE >

| 1 | 1 | 1 | 1 | 2 | 2 | 2 | 2 |
|---|---|---|---|---|---|---|---|
| 1 | 1 | 1 | 1 | 2 | 2 | 2 | 2 |
| 1 | 1 | 1 | 1 | 2 | 2 | 2 | 2 |
| 1 | 1 | 1 | 1 | 2 | 2 | 2 | 2 |
| 3 | 3 | 3 | 3 | 4 | 4 | 4 | 4 |
| 3 | 3 | 3 | 3 | 4 | 4 | 4 | 4 |
| 3 | 3 | 3 | 3 | 4 | 4 | 4 | 4 |
| 3 | 3 | 3 | 3 | 4 | 4 | 4 | 4 |

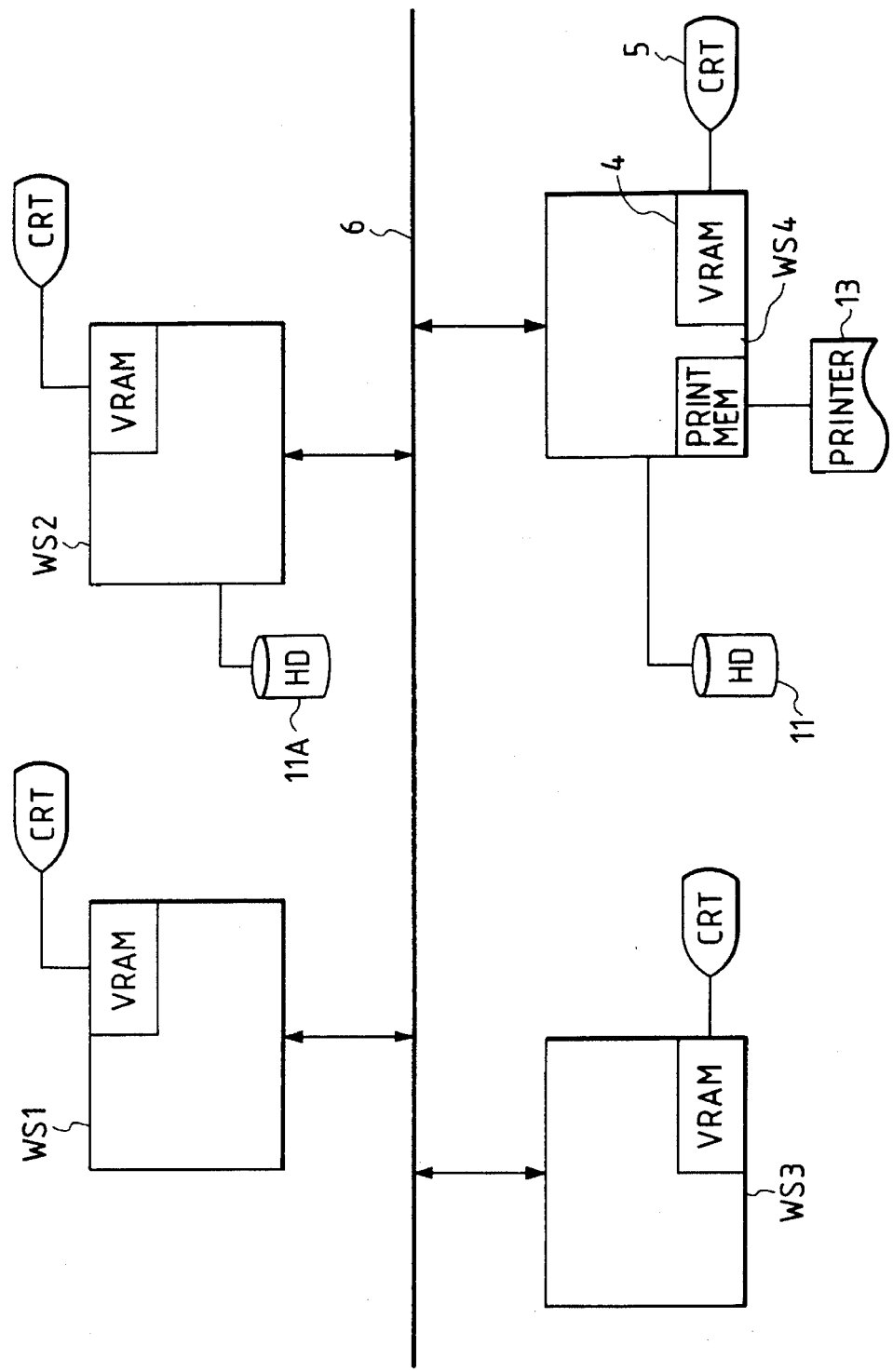

IMAGE PROCESSING APPARATUS UTILIZING THE JBIG METHOD, HAVING A COMPRESSION/EXPANSION CIRCUIT TO MANAGE MEMORY MORE EFFECTIVELY

BACKGROUND OF THE INVENTION

1. Field of the Invention

The present invention relates to an image processing apparatus having compression/expansion function for image data and display function therefor, and more particularly to an image processing apparatus utilizing the JBIG method.

2. Related Background Art

In the conventional word processor or the like equipped with the window display system, there has been observed difference in resolution, between the image data obtained by a scanner and the display data for a CRT.

For example when the image obtained by an image scanner has a resolution of 400 dpi while the CRT has a resolution of 100 dpi, there has been conducted a conversion from 400 to 100 dpi, in order to obtain image data for display.

Similarly, in the display image buffer, there have been stored image data of 100 dpi.

Also it has been very difficult to display the image in the high-speed page flipping mode in which the image frames are scrolled at a high speed, in the unit of a page. In such high-speed page flipping mode, because of the limitation in the speed or in the memory capacity, the images are not displayed but the page number alone is varied with the blank image frame. For example, in case of image display with the image data compressed by the conventional MMR compression/expansion method, image data which are compressed from the image of 400 dpi by said MMR method and stored in a rigid disk or a floppy disk, are converted into the image data of 400 dpi by an expansion circuit and stored in an image memory. Then said image data of 400 dpi are read from the image memory and compressed to 100 dpi by a compression circuit, then are transferred and stored in a VRAM, and are displayed on a display device such as CRT. Since such expansion and compression require time, it has been difficult to execute the high-speed page flipping with image display, or so-called high-speed image display.

Naturally such high-speed page flipping with image display is theoretically possible by effecting such page flipping operation after all the image data of 100 dpi to be subjected to the high-speed page flipping are stored in the VRAM or the like, such operation is practically unacceptable, because a long time is required for preparation and a large memory capacity is required in the VRAM. Also in a system which does not employ compressed data, the image memory is generally designed for 400 dpi which is the resolution of the scanner or the printer, and the image display is executed by compressing the data to the resolution of CRT of 100 dpi and transferring thus compressed data to the VRAM for display. Consequently, in consideration of the speed and the required memory capacity, the high-speed page flipping operation, involving a large amount of images, has been conducted without the image display.

The clipping operation, for clipping a partial image displayed on the display frame for making an icon, requires several seconds to about twenty seconds for each image because it involves image compression for preparing a reduced image. In the conventional process, after the user designates the clipping area of the image, said image remains displayed in its original size during the clipping operation in the apparatus, and said image suddenly vanishes when the clipping operation is completed.

In the general image display on a display device such as CRT, the display image data are stored in the unit of a page in a display image buffer area in the main memory, then said data are transferred to the VRAM, and the images are displayed in succession, in the unit of a page at a time, on the display device such as CRT through said VRAM. Consequently, when the capacity of the residual memory area of the display image buffer area becomes less than an image frame, the storage of the display image data is interrupted at this point and the subsequent images cannot be displayed.

In case the icons for an image file are not prepared by the application software, such icons have to be prepared by the operator. However, since it is difficult to display all the necessary information in the icons, it has been generally been conducted to display a text of a certain number of characters in the icon, or to display icons fixed in advance in the system.

However, the conventional technology explained above has been associated with the following drawbacks:

(1) The image data for display have to be obtained by conversion from the real image data;

(2) Such conversion is indispensable even for merely obtaining the image data for display;

(3) The capacity of the image memory may become deficient in case of storing a large number of display image data;

(4) The conventional high-speed page flipping operation has been very inconvenient for the selection or retrieval of images, since, in such operation, the images are not displayed but the page number alone is varied;

(5) In the clipping operation of image data, the image to be clipped remains displayed in the course of said operation, and said image suddenly vanishes thereafter. Thus the user feels uneasy and inconvenient, as the progress of the operation is unclear to the user;

(6) When the capacity of the residual memory area of the display image buffer area becomes less than an image frame, the image display is automatically interrupted even if a considerable residual area still exists. Such mode of operation is inconvenient to the user, and is undesirable for the effective utilization of the memory; and (7) The number of icons often increases for an image file, and the image represented by the icon sometimes becomes forgotten and uncomprehendable after a time.

SUMMARY OF THE INVENTION

The object of the present invention is to resolve the aforementioned drawbacks, and to provide an image processing apparatus capable of providing improved display capability convenient for the user, with a simple structure.

More specifically, a first object of the present invention is to effectively utilize, for the purpose of display, the image data obtained in the course of expansion of image data of a low resolution, thereby achieving prompt preparation of the display image data, simplification in the structure and reduction in cost.

A second object of the present invention is to effectively utilize, for the purpose of display, the image data obtained in the course of expanding icon data displayed in the window, thereby achieving prompt icon display and simplification in structure.

A third object of the present invention is, even in case all the display image data cannot be stored in the image memory, to enable storage of the remaining data through the utilization of data of a 10 lower resolution, thereby achieving effective utilization of the image memory and improved processing capability.

A fourth object of the present invention is to enable image display even in the high-speed page flipping operation in a simple and prompt manner without burden on the image memory, thereby achieving improved display capability convenient for the user.

A fifth object of the present invention is, in the clipping operation of the image data, to render the progress of said operation in time clearly visible, thereby eliminating the uneasiness on the part of the user and attaining improved operability.

A sixth object of the present invention is, in case the capacity of the residual memory area of the display image buffer area becomes less than an image frame, to enable display of at least a remaining image, theregy achieving effective utilization of the image memory and improving the convenience of the user.

A seventh object of the present invention is to provide an image processing apparatus capable of preparing icons containing necessary information of the original image.

BRIEF DESCRIPTION OF THE DRAWINGS

FIGS. 14 to 16 are views showing specific examples of the sequence shown in FIG. 13;

FIG. 46 is a block diagram of an image processing system.

DESCRIPTION OF THE PREFERRED EMBODIMENTS

Now the present invention will be clarified in detail by preferred embodiments thereof shown in the attached drawings.

Embodiment 1

Figure 1:
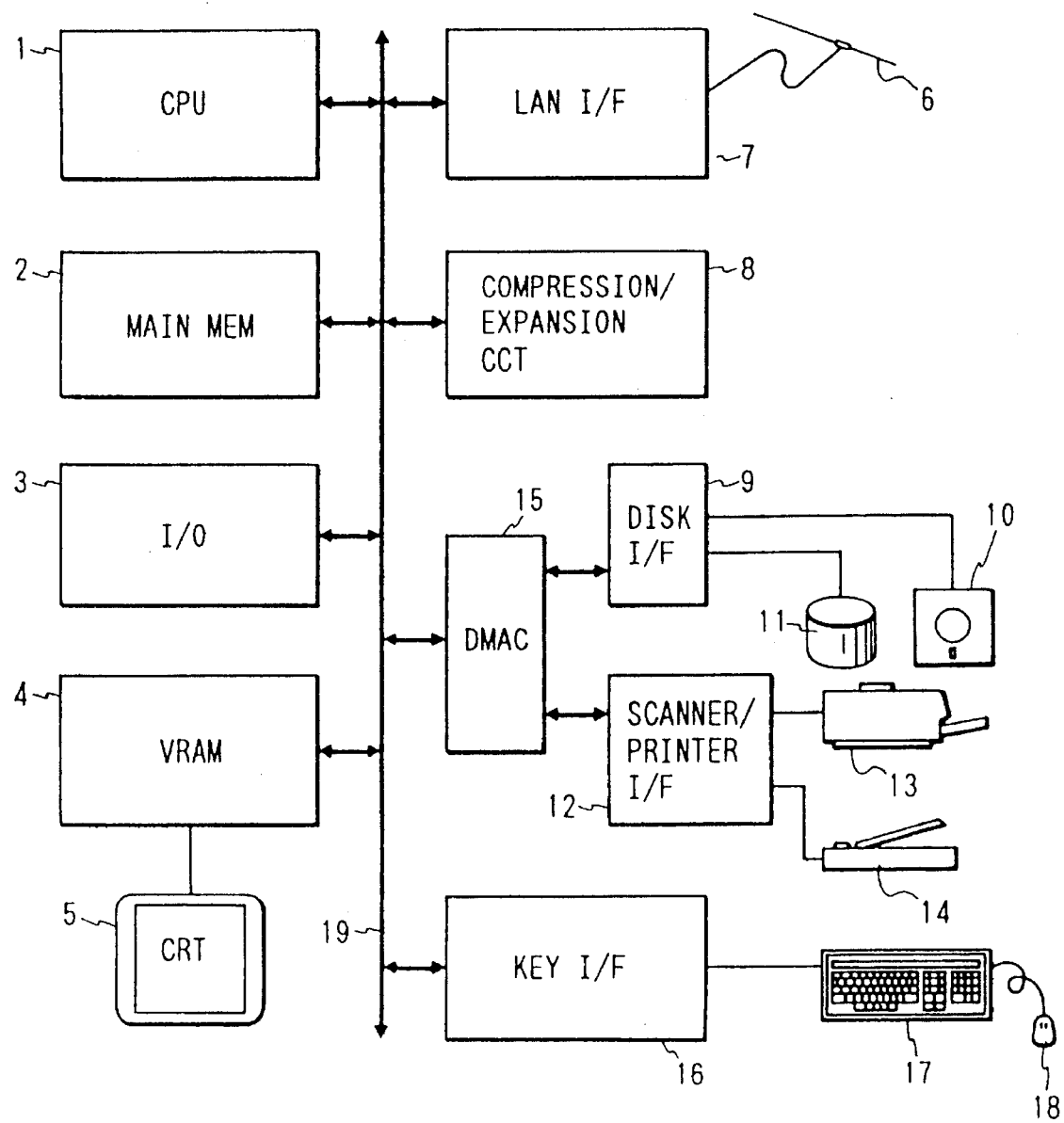
FIG. 1 is a block diagram of an embodiment 1 of the present invention.

FIG. 1 illustrates an embodiment 1 of the present invention, wherein following units are connected to a system bus 19.

A central processing unit (CPU) 1 controls the functions of the entire apparatus, and also effects image editing operation according to a system program stored in a memory 2.

A main memory 2 stores the system program to be executed by the CPU 1, and also contains an image memory for storing image data to be subjected to the image editing, and a work memory for storing various data related to the image processing.

An input/output interface (I/O) 3 effects data transfer with external equipment.

A video random access memory (RAM) 4 stores image data of an image frame to be displayed on a CRT (display unit) 5. The image data stored in the video RAM 4 are read by the CRT 5 and visually displayed. The image data stored in the video RAM 4 have a resolution of 100 dpi (dot/inch).

ALAN (local area network) interface 7 effects data transfer with other image processing apparatus connected to the LAN.

A compression/expansion circuit 8 stepwise compresses the image data of 400 dpi, under the instruction of the CPU, thus generating compressed encoded image data of 12.5 dpi.

It also expands the compressed image data of 12.5 dpi, under the instruction of the CPU 1, to image data of 400 dpi. Said compression/expansion circuit 8 effects the compression or expansion in the JBIG method.

A direct memory access controller (DMAC) 15 is connected to a disk interface 9 and a scanner/printer interface 12 and effects reading/writing of the image data of input/output units (scanner 14, printer 13) and memory media (floppy disk 10, rigid disk 11) from or to a memory area, instructed by the CPU 1, in the main memory 2.

A key interface 16 transfers, to the CPU 1, the information entered from a keyboard 17 or a coordinate input device 18 called mouse.

Figure 2:
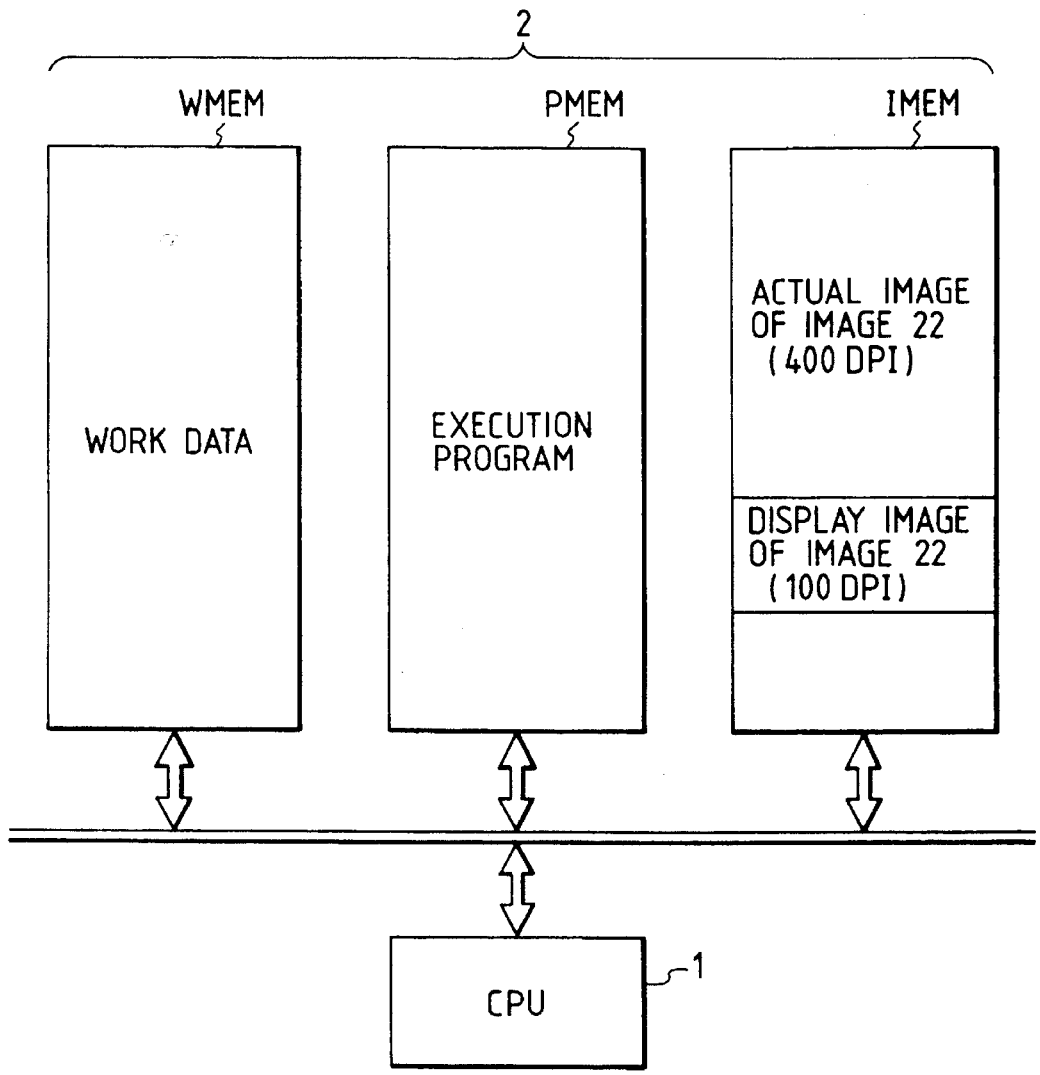
FIG. 2 is a view showing areas of a main memory shown in FIG. 1.

FIG. 2 illustrates areas of the main memory 2 shown in FIG. 1.

There are provided an image area IMEM for storing image data from the scanner 14; a program area PMEM for storing a program to be executed; and a work area WMEM for storing work data.

In the following explained is the compression/expansion process of the JBIG method, to be executed by the compression/expansion circuit 8 shown in FIG. 1.

The details of said JBIG method are described in the Journal of Image Electron Academy, Vol. 20, No. 1 (1990), pp. 41–49. This method will be briefly explained in the following.

Figure 3:
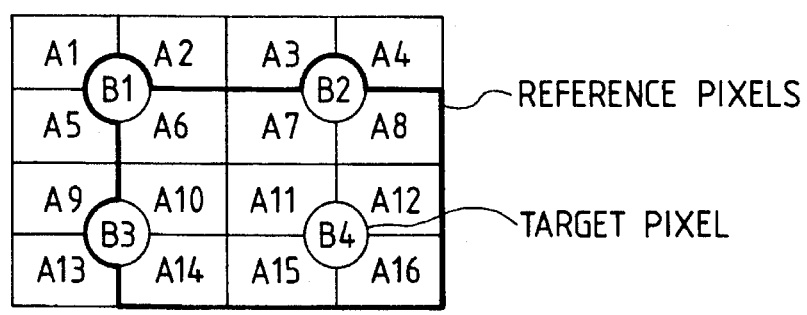
FIG. 3 is a chart showing the principle of the compression or expansion of the JBIG method.

In case of compressing image data of 4×4 pixels as shown in FIG. 3, the pixel data A1–A16 of 4×4 pixels for example of 400 dpi are compressed to pixel data B1–B4 of 200 dpi, and the differences of the compressed pixel data B1–B4 and the original pixel data A1–A16 are encoded. The compressed pixel data are considered as new pixel data A1–A16 for compression and are subjected to compression and encoding. The compression is conducted in this manner to the image data of minimum resolution of about 12.5 dpi, which are used for communication or storage, together with the encoded data.

In the data expansion, the image data of minimum resolution (12.5 dpi) and the corresponding encoded data are utilized for preparing the image data of an upper rank (25 dpi). Subsequently image data of higher resolutions are prepared in succession, up to the original image data of 400 dpi.

In the JBIG method, compressed data of a pixel, for example B4 in FIG. 3, is determined by entering the high resolution pixel data of A6–A8, A10–A12 and A14–A16 surrounded by a thick line and the already compressed pixel data B1–B3 into a weighting equation.

Also the data employed for encoding are taken from the data of the reference pixels, but the positions and number of said reference pixels are made variable according to the contents of such reference around the target pixel to be encoded.

Figure 4:
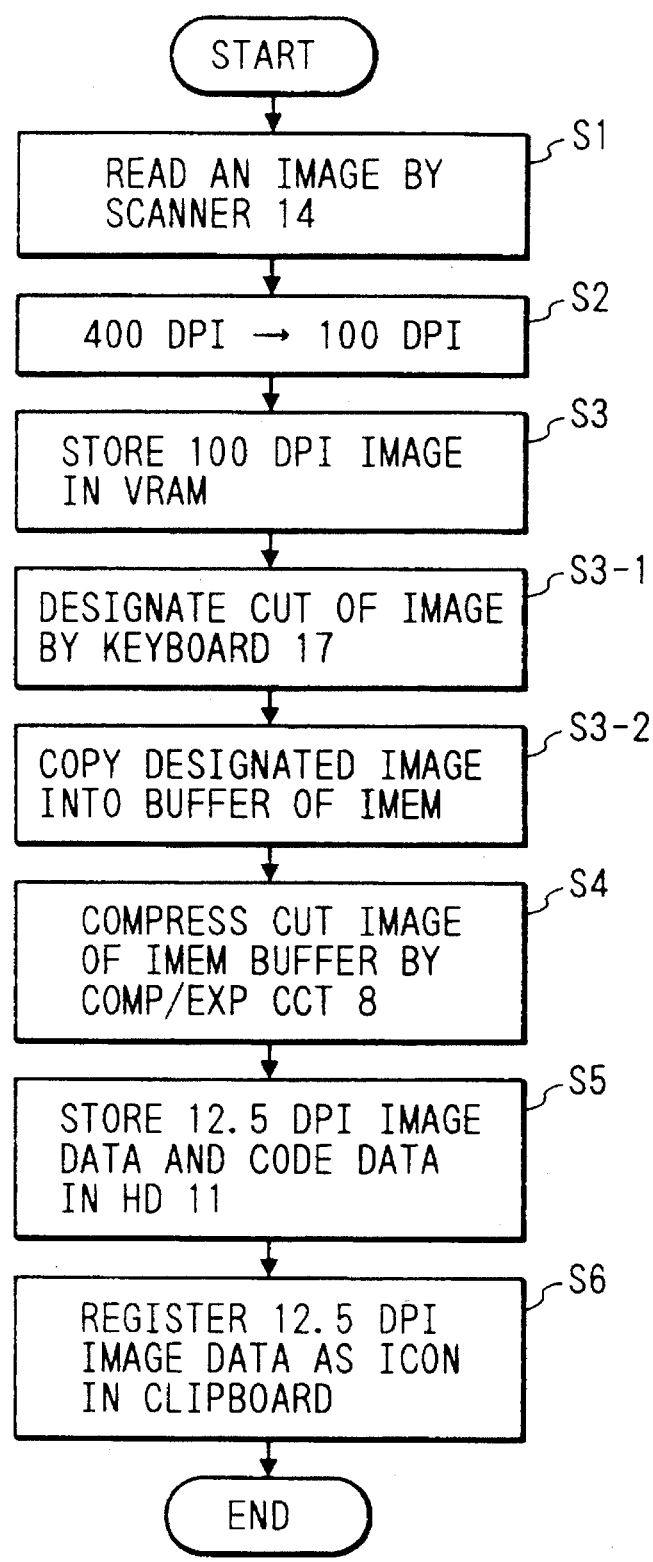
FIG. 4 is a flow chart showing an example of the control program to be stored in a program area PMEM shown in FIG. 2.

FIG. 4 is a flow chart showing an example of the control program stored in the program area PMEM shown in FIG. 2.

In a step S1, an image, for example of a ship, is read by the scanner 14 of 400 dpi, and the obtained image information of 400 dpi is stored in the image area IMEM of the main memory 2. Said image information is converted to a lower resolution, by the compression/expansion circuit 8 according to the JBIG method, and the obtained image information of 100 dpi is stored in a buffer memory of the image area IMEM.

Figure 5:
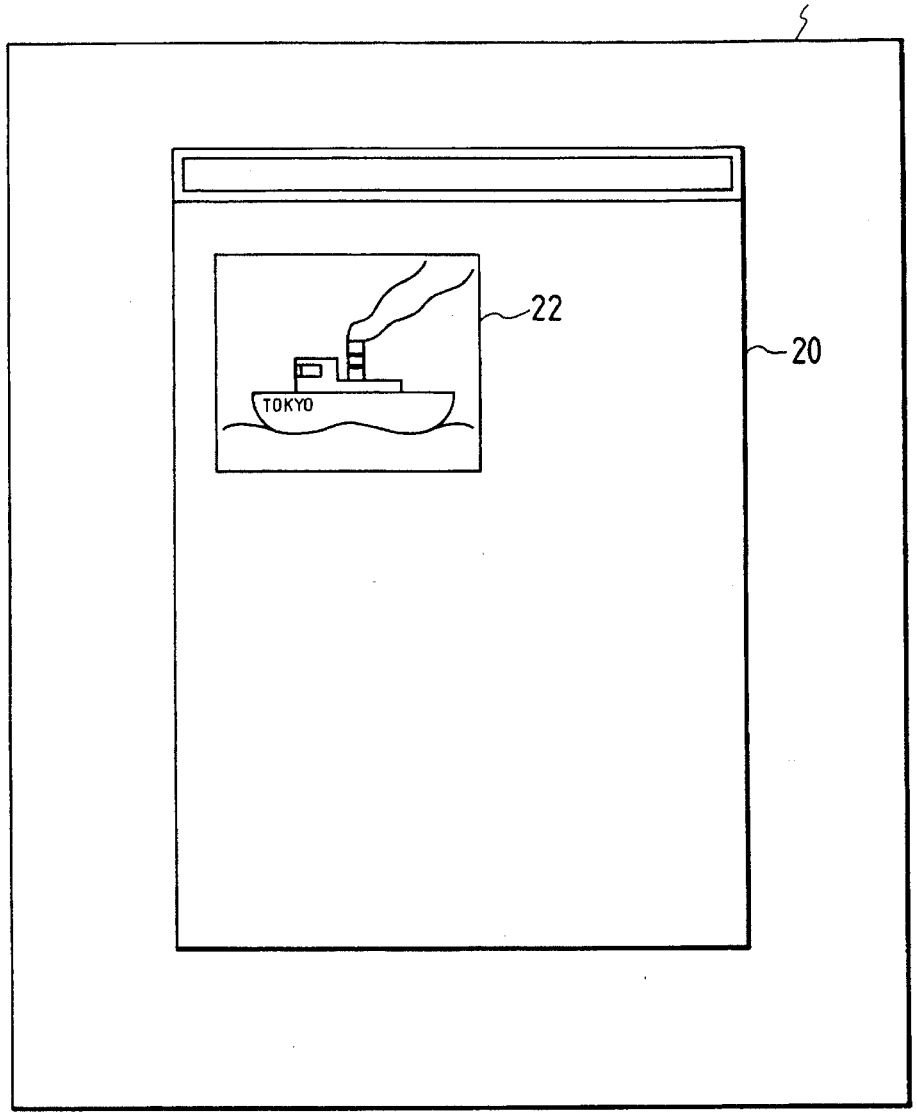
FIG. 5 is a view showing an example of the original image.

Then a step S2 releases the image information of 100 dpi from the buffer memory to the system bus, and a step S3 stores said information in the VRAM 4. As shown in FIG. 5, in a window 20 of the image frame 21 of the CRT 5, a ship image 22 of 100 dpi is displayed.

Then, in a step S3-1, an image clipping is instructed from the keyboard 17. It is assumed that the clipping of the entire read image of ship is instructed. A step S3-2 copies the image data (400 dpi), instructed for clipping, on the image area IMEM of the main memory 2. Then a step S4 compresses the clipped image data, prepared in the buffer of the image memory IMEM, by the compression/expansion circuit 8 according to the JBIG method, thereby obtaining a low resolution image of 12.5 dpi. Then a step S5 stores the image data of 12.5 dpi and the encoded data in the rigid disk 11, and stores the image data of 12.5 dpi in another buffer of the main memory 2.

Figure 6:
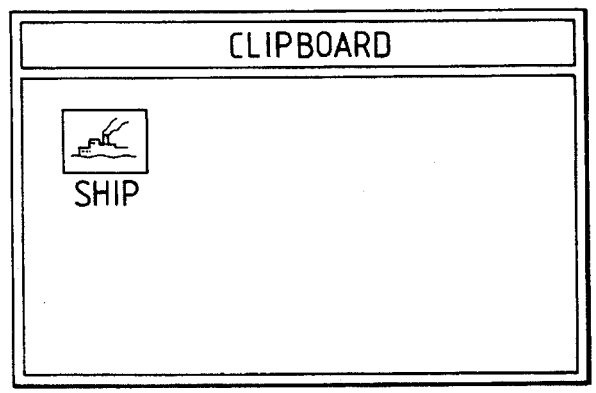
FIG. 6 is a view showing an example of the prepared icon.

A step S6 registers the image data stored in the buffer as an icon, then stores said image data in the VRAM 4 through the system bus, and displays a ship image of 12.5 dpi, reduced to a size of (1/16)×(1/16) of the original image, on a clipboard window on the image frame 21. FIG. 6 illustrates the icon displayed on the clipboard window.

Embodiment 2

Figure 7:
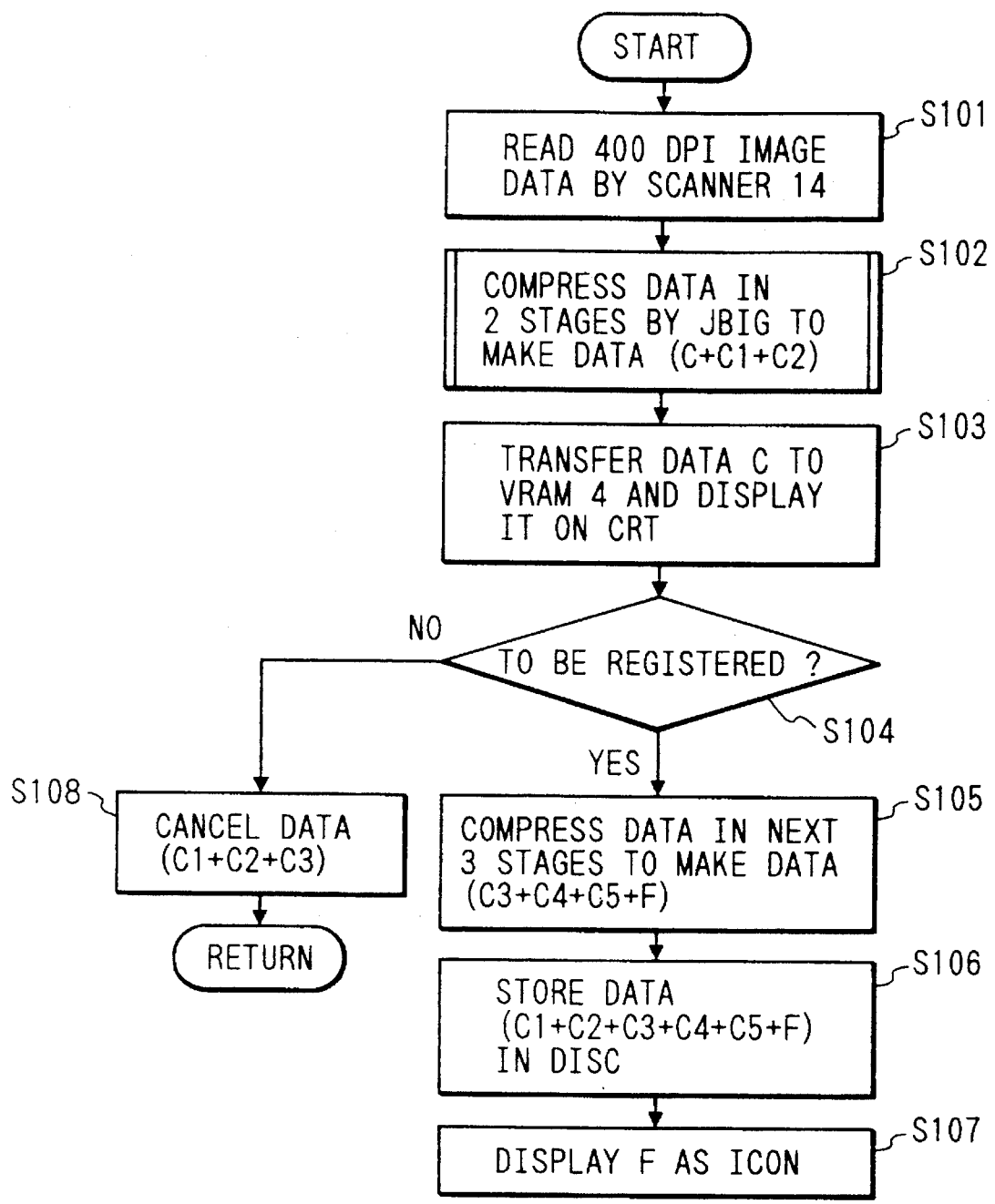
FIG. 7 is a flow chart showing the sequence for displaying image data generated in the course of the JBIG method.

FIG. 7 is a flow chart of an embodiment 2 of the present invention, indicating the process for image display with a resolution of 100 dpi on the CRT 6.

Figure 11:
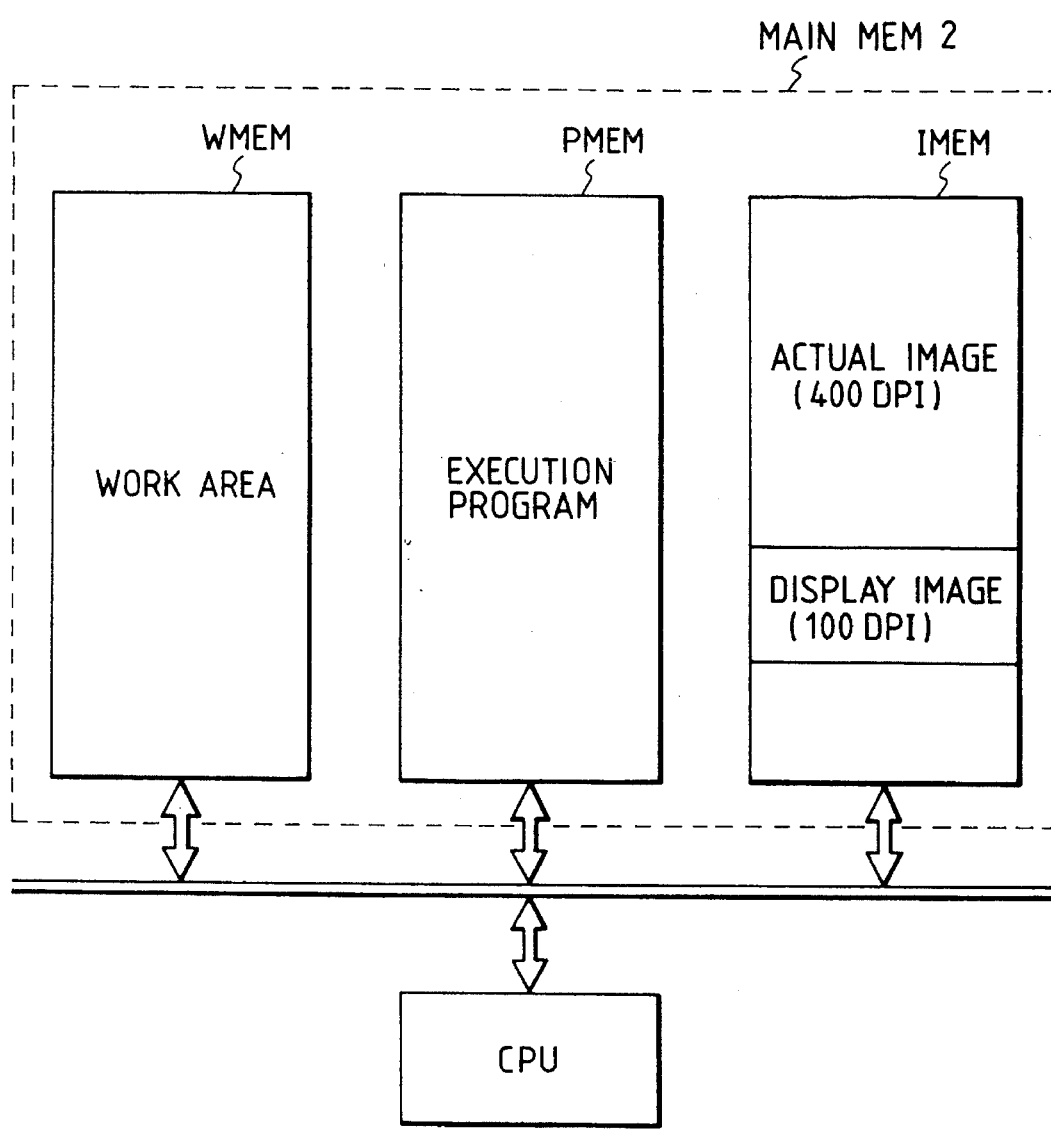
FIG. 11 is a view of the structure of a main memory.

A step S101 reads the image data of 400 dpi by the scanner 14, and stores the read image data of 400 dpi in the image memory IMEM of the main memory 2 (cf. FIG. 11).

Figure 8:
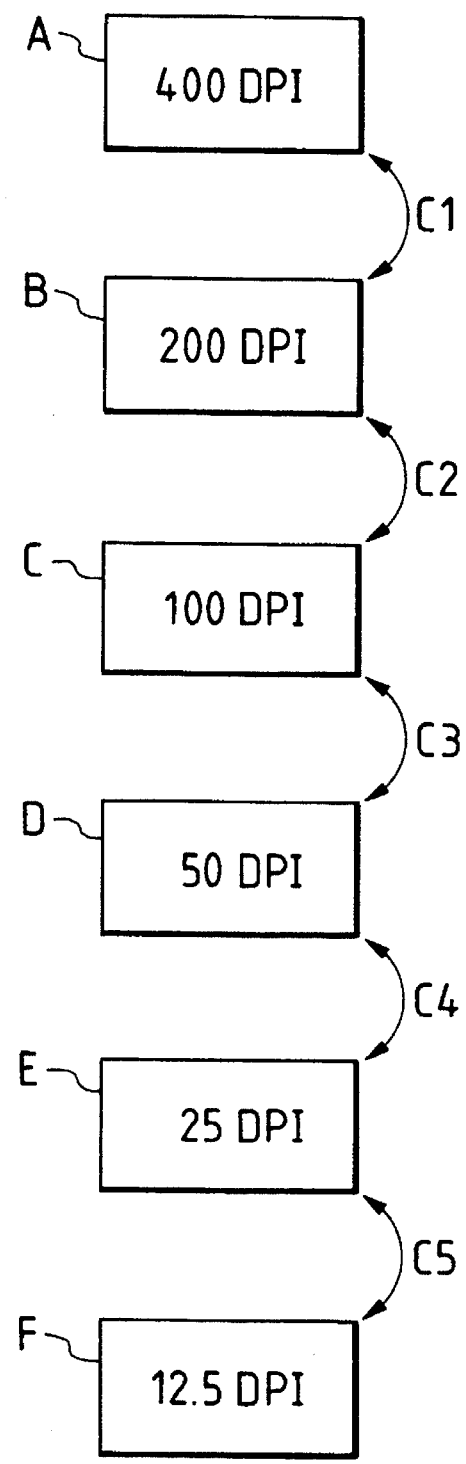
FIG. 8 is a view showing low resolution data and differential code data, generated by the hierarchical encoding of the JBIG method.

Then for hierarchical encoding by the JBIG method, a step S102 effects compressions of two steps in the JBIG method, thereby obtaining data C+C1+C2, wherein C indicates the data of lower resolution (100 dpi) obtained by stepwise reduction of resolution in the JBIG method as shown in FIG. 8, and C1 and C2 indicate the encoded difference data.

A next step S103 transfers said data C (100 dpi), stored in IMEM of the main memory, to the VRAM 4, and displays said data on the CRT.

A next step S104 discriminates whether the hierarchical encoded data obtained in the JBIG method are to be registered as a file, and, if affirmative, a step S105 effects compressions of three steps to prepare data C3+C4+C5+F (cf. FIG. 8).

Then a step S106 stores the data C1+C2+C3+C4+C5+F in the disk, and a step S107 effects the window display of data F as an icon as in the foregoing embodiment (in practice there is executed a process for pasting said icon on the clipboard).

As explained in the foregoing, the present embodiment can transfer the image of 100 dpi, obtained in the stepwise encoding, to the VRAM for visual display.

Figure 9:
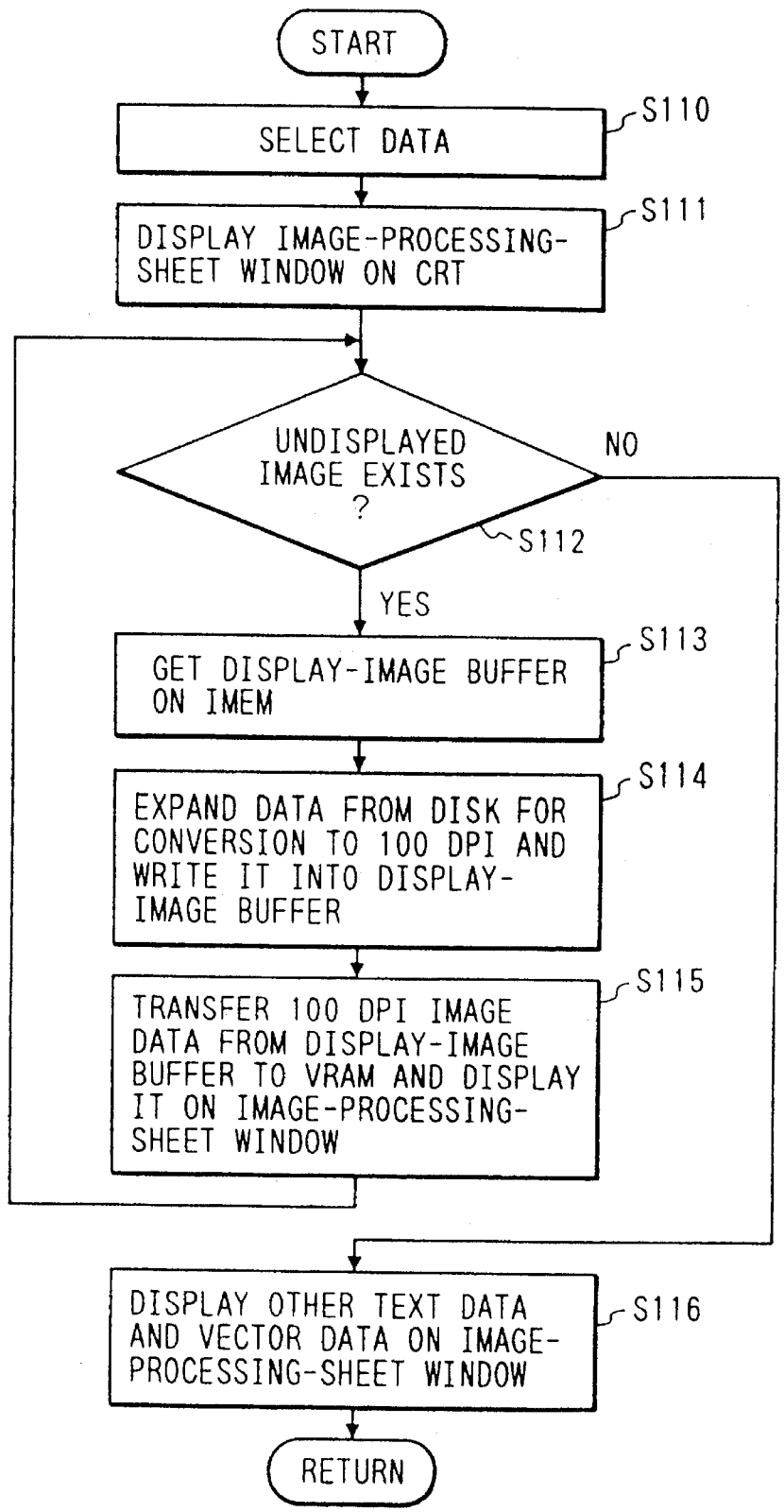
FIG. 9 is a flow chart showing the sequence of displaying image data generated in the course of the JBIG process.

FIG. 9 shows a variation of this embodiment, in which the image data stored in the rigid disk 11 or the floppy disk 10 (namely low resolution data F of 12.5 dpi and encoded data C1–C5: cf. FIG. 8) are read to the main memory 2 and are displayed on the CRT 5.

At first a step S110 selects the data to be displayed. More specifically, one of the displayed icons is selected by the mouse. Then a step S111 displays an image processing sheet window on the CRT. Then a step S112 discriminates whether an undisplayed image is present, and, if affirmative, a step S113 acquires a display image buffer area on the image memory IMEM of the main memory 2.

A next step S114 converts the data, read from the rigid disk or the floppy disk, to 100 dpi by the expansion circuit, and writes the expanded data in the display image buffer. A next step S115 transfers the image data of 100 dpi from the display image buffer to the VRAM, thereby displaying an image on the image processing sheet window.

If the step S112 identifies that the undisplayed image is absent, the sequence proceeds to a step S116 for displaying other text data or vector data on the image processing sheet window.

As explained above, the present embodiment can directly store the data of 100 dpi in the display image buffer, utilizing the feature of the JBIG method of increasing the resolution in succession from the image data of lowest resolution (12.5 dpi), without the conventional procedure of once storing the image data of 400 dpi in the main memory 2 and converting said data to 100 dpi.

Figure 10:
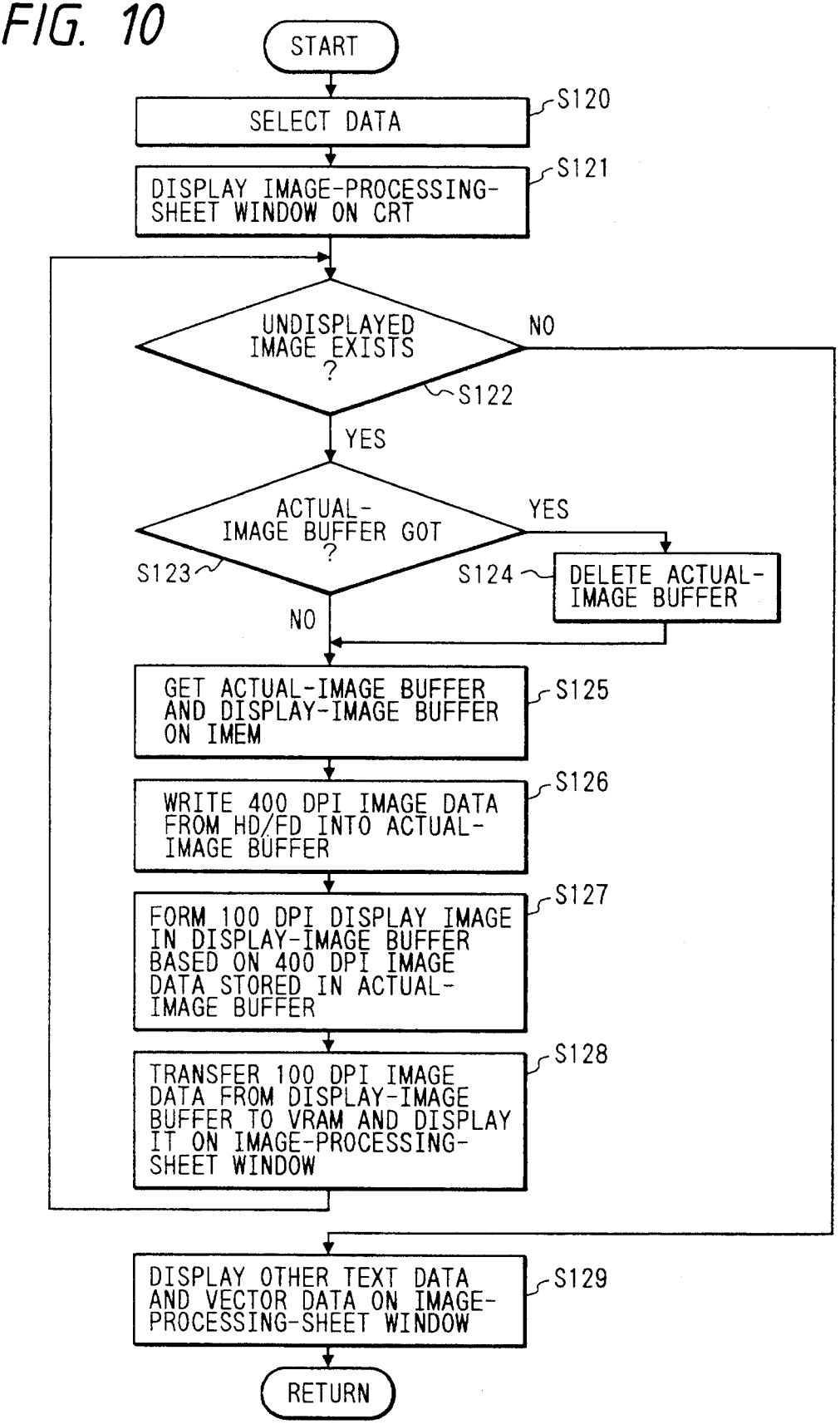
FIG. 10 is a flow chart showing a conventional example corresponding to FIG. 9.

FIG. 10 shows, as reference, the conventional technology corresponding to the embodiment shown in FIG. 9, and the comparison of FIGS. 10 and 9 will clarify the feature of the present embodiment.

The sequence shown in FIG. 10 is as follows. At first a step S120 selects the data to be displayed, and a next step S121 displays an image processing sheet window on the CRT.

If a step S122 identifies the presence of an undisplayed image, a step S123 discriminates whether a real image buffer (for 400 dpi) has been acquired on the main memory. If such buffer area has been acquired, a step S124 erases said real image buffer.

Then a next step S125 acquires a real image buffer and a display image buffer area on the image memory IMEM of the main memory. Then a step S126 writes the image data (400 dpi) from the rigid disk or floppy disk, into the real image buffer. A step S127 prepares a display image (100 dpi) in the display image buffer, based on the image data (400 dpi) stored in the real image buffer. A next step S128 transfers the image data (100 dpi) from the display image buffer to the VRAM, thereby displaying an image in the image processing sheet window.

On the other hand, if the step S122 identifies the absence of the undisplayed image, a step S129 displays other text data or vector data on the image processing sheet window.

Figure 12:
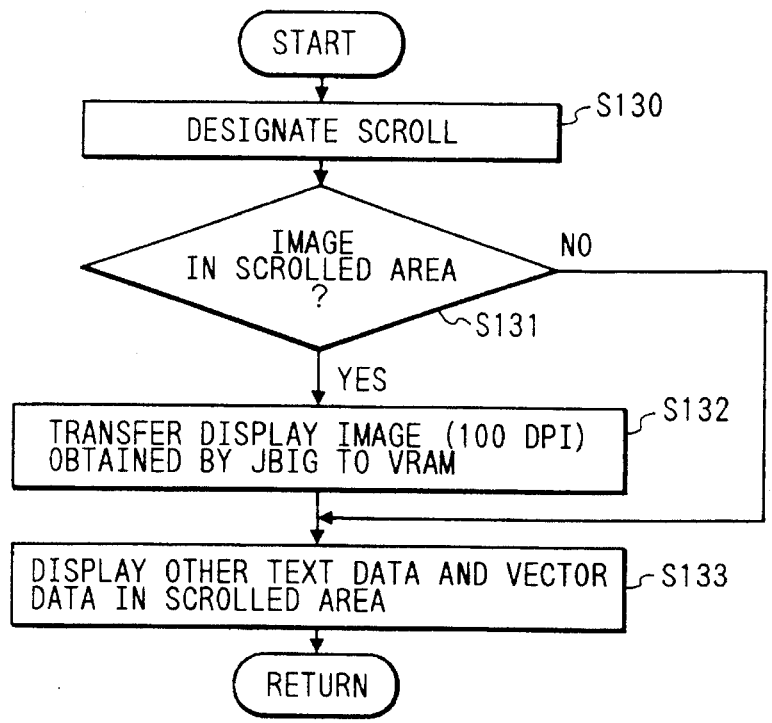
FIG. 12 is a flow chart for control sequence for a scrolling display.

In contrast to the conventional technology shown in FIG. 10, the present embodiment utilizes the image data of 100 dpi, obtained in the course of expansion by the JBIG method, for display. Consequently, also in case of scroll display, there can be dispensed with the process of converting the data of 400 dpi to 100 dpi, according to a procedure shown in FIG. 12. 10 Referring to FIG. 12, a step S130 instructs the scrolling display. A next step S131 discriminates whether the scrolling area contains an image, and, if affirmative, a step S132 transfers the display image (100 dpi), expanded by the JBIG method, to the VRAM. Then a step S133 displays other text data or vector data in the scrolling area.

Embodiment 3

An embodiment 3, to be explained in the following, provides a procedure for expanded display of an identification mark displayed in a part of the CRT (namely an icon pasted on the clipboard).

Figure 13:
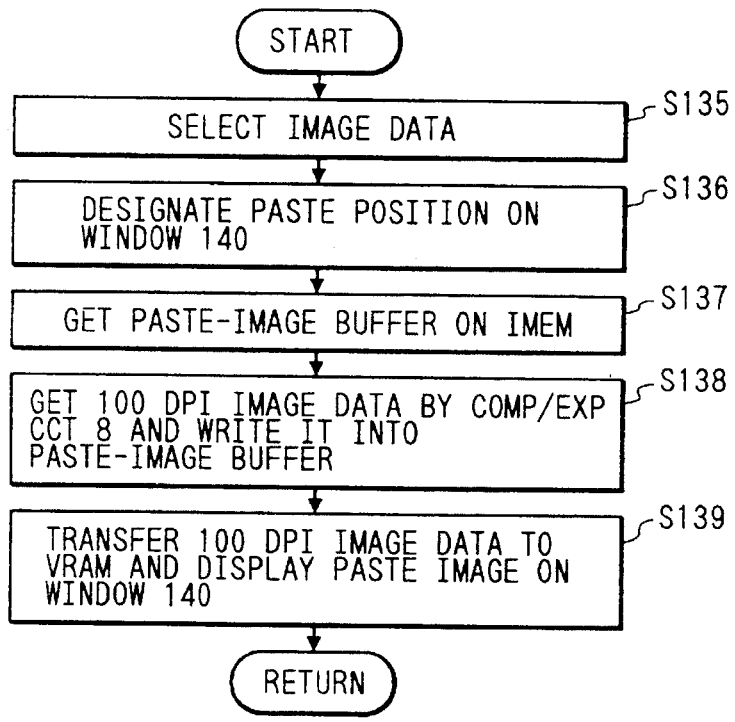
FIG. 13 is a flow chart of the sequence for extending an icon on the clipboard and pasting it on another display area.

FIG. 13 is a flow chart showing the control sequence of said embodiment 3, and FIGS. 14 to 16 show the examples of display in a process of selecting an icon on the clipboard (said icon being displayed in reduced size with 12.5 dpi, as explained before) and fitting said icon on a desired edited position.

The flow chart shown in FIG. 13 will be explained in the following, with reference to FIGS. 14 to 16.

At first a step S135 selects image data to be pasted. For example, a ship image (12.5 dpi) is selected from plural icons on the clipboard, as shown in FIG. 14. Then a step S136 designates the position of pasting on the image processing sheet window (cf. FIG. 15).

A next step S137 acquires a pasting image buffer area in the image memory IMEM of the main memory 2.

A next step S138 increases the resolution to 100 dpi by the compression/expansion circuit 8, based on the data (data of lowest resolution and encoded difference data) stored in the rigid disk, and writes said image data of 100 dpi in the pasted display image buffer. A last step S139 transfer the image data of 100 dpi from said buffer to the VRAM, for displaying a pasted image on the image processing sheet window (cf. FIG. 16).

As explained in the foregoing, the present embodiment can directly display the data of 100 dpi obtained in the course of expansion of the icon of 12.5 dpi on the clipboard, and can therefore dispense with the process of converting the data of 400 dpi into data of 100 dpi for display. This feature will be more clearly understood from the comparison with a conventional technology shown in FIG. 17.

Figure 17:
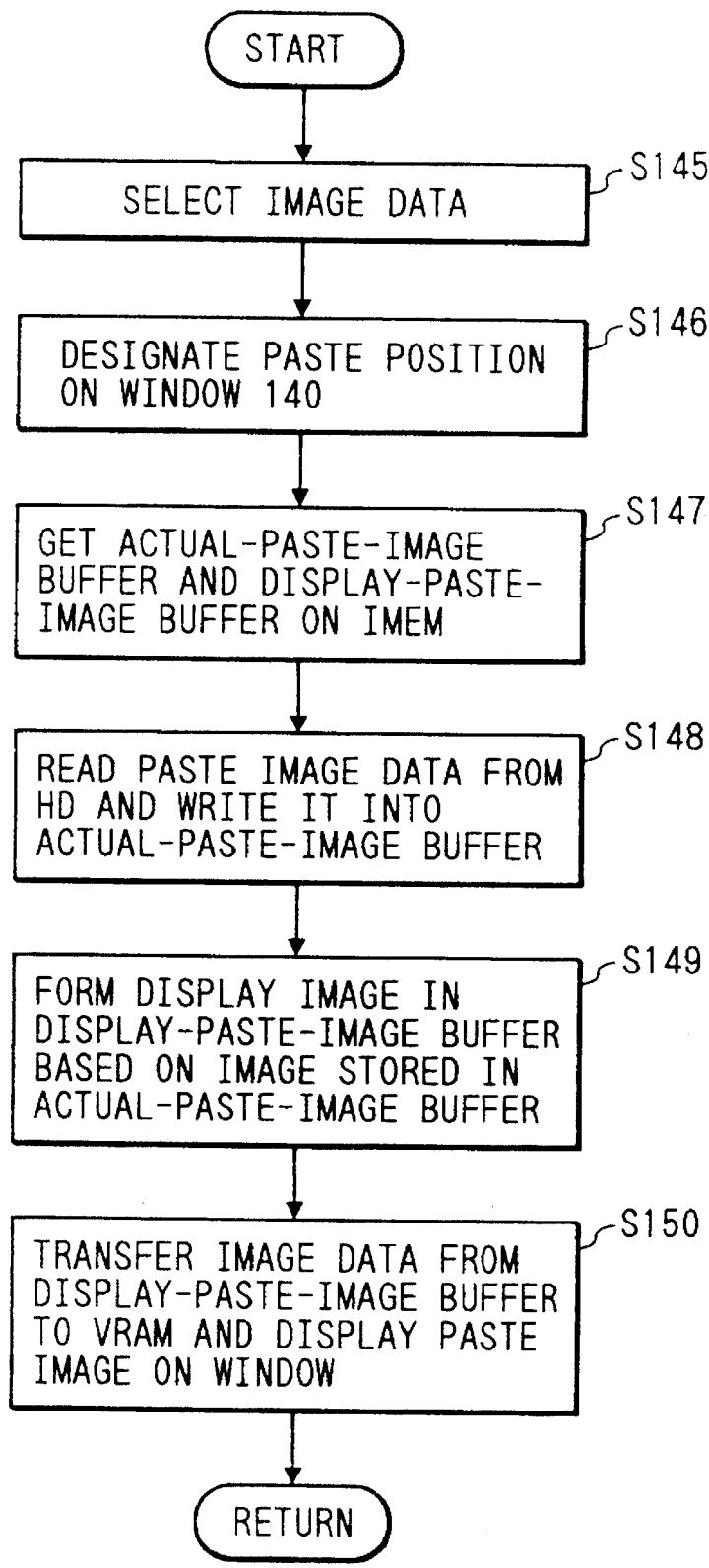
FIG. 17 is a flow chart showing a conventional example corresponding to FIG. 13.

In the conventional technology shown in FIG. 17, at first a step S145 selects the image data to be pasted, then a step S146 designates the location of pasting on the image processing sheet window, and a step S147 acquires a real pasted image buffer area and a displayed image buffer area in the image memory IMEM of the main memory.

Then a step S148 transfer the image data to be pasted, from the rigid disk, to said real pasted image buffer area.

A next step S149 prepares, from the image data transferred to said real pasted image buffer, a display image in the display image buffer area. A last step S150 transfers the image data from said display image buffer to the VRAM, thereby displaying a pasted image on the image processing sheet window.

Embodiment 4

An embodiment 4 of the present invention attains effective utilization of the image memory area IMEM of the main memory 2, thereby enabling to store a larger number of display images.

Figure 18:
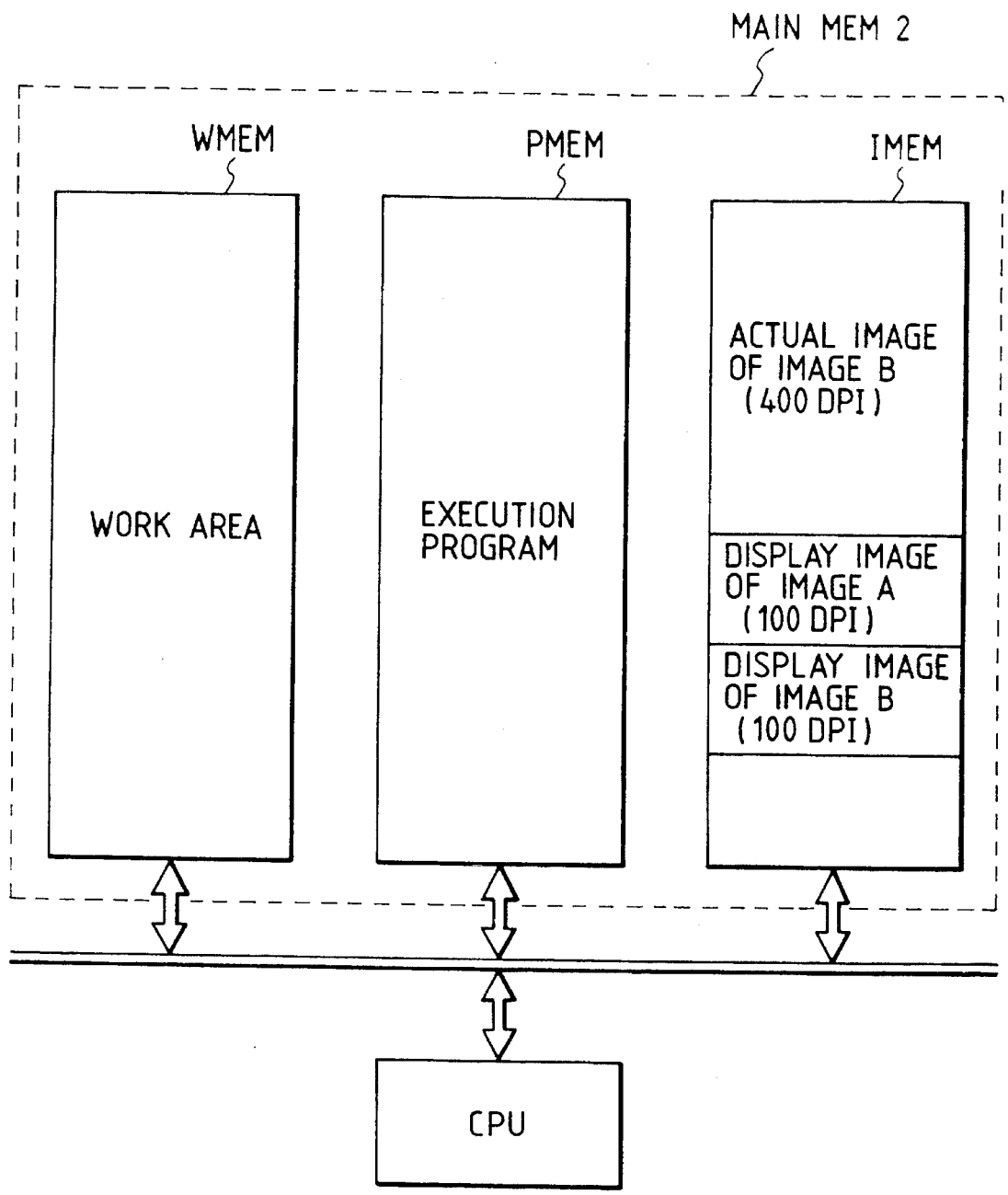
FIG. 18 is a view showing a state in which display data of 100 dpi are stored in the main memory.

FIG. 18 shows a general occupied state of the image buffer in the main memory. The image memory area IMEM is storing display images for displaying two images A, B on the CRT.

Such state of the IMEM is obtained in the following manner. At first a first image A, read by the scanner 14, is stored in the IMEM as a real image of 400 dpi, then said image is-converted to a display image (100 dpi) for display on the CRT, and the converted data is stored in the IMEM, as the display image (100 dpi) for the image A. Then a second image B is read by the scanner 14, and the real image data of 400 dpi is overlaid in the area which stores the real image (400 dpi) of the image A, whereby the real image (400 dpi) of the image B is stored in the IMEM. Then a display image, obtained by conversion to 100 dpi, is stored for the image B.

However, the memory area may become deficient if a larger number of display image data (100 dpi) is to be stored.

Consequently, in the present embodiment, images of lower resolution (for example 25 dpi) are stored for display, instead of the resolution of 100 dpi for display. Thus the present embodiment enables to store all the necessary image data in the IMEM, utilizing the formation of images of lower resolution by the hierarchical encoding of the JBIG method.

Figure 19:
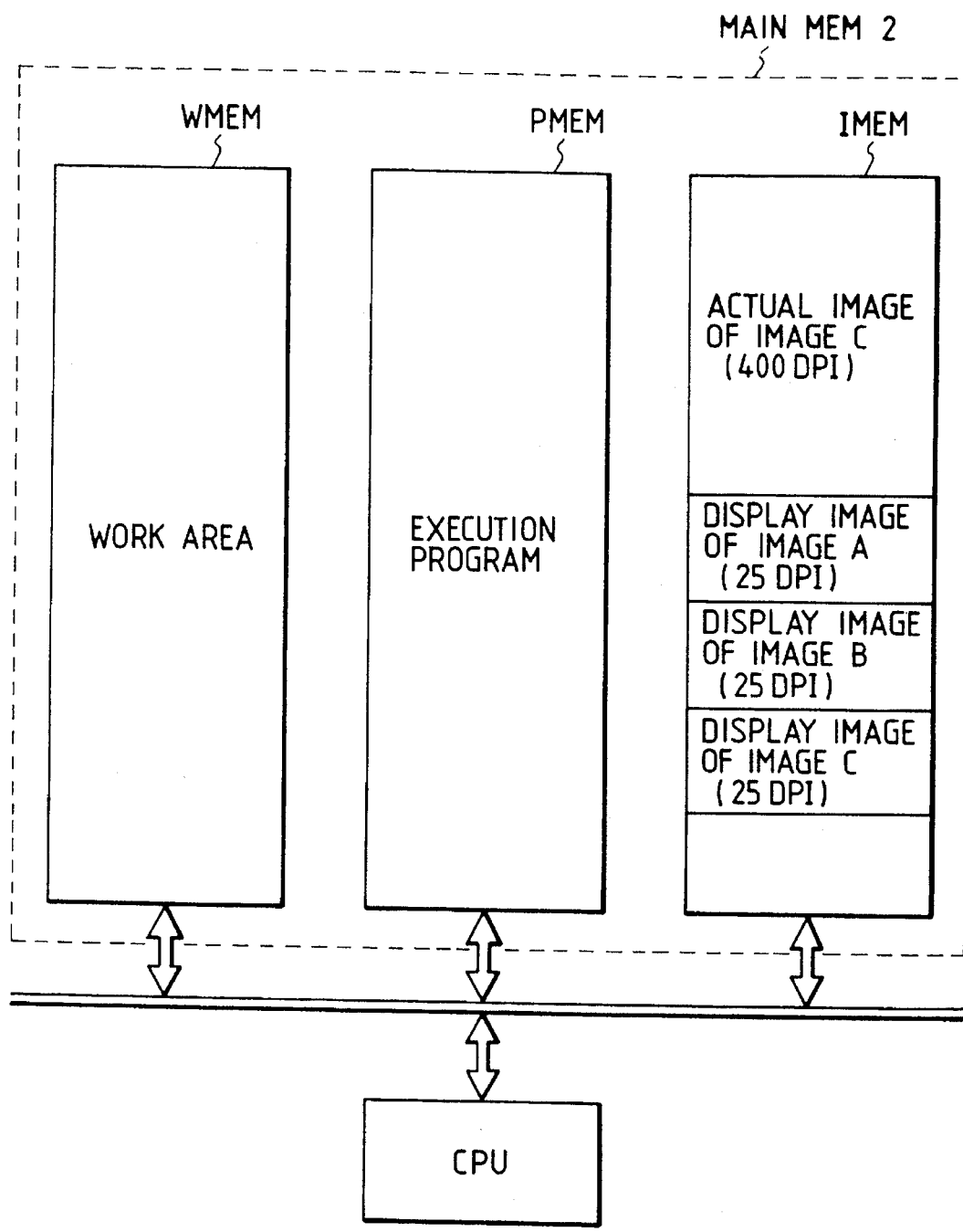
FIG. 19 is a view showing a state in which display data of 25 dpi are stored in the main memory.

FIG. 19 shows a state in which the image memory area IMEM of the main memory 2 stores the display image data (25 dpi) of three images A, B and C. Said display image data may be of a resolution of 50 dpi, or even of 12.5 dpi.

In displaying these images on the CRT, there may be arbitrarily selected, according to the equipped window system whether to display an image of 100 dpi by expansion, or to display plural reduced images of 25 dpi at the same time.

The foregoing description is based on a principle of storing display image data prepared from the real image data read by the scanner, but it is also possible to expand the low resolution image data of 12.5 dpi and the encoded difference data, already stored in the disk, and to use thus expanded data for display.

The procedure of forming display image data of 25 dpi and storing said data in the area IMEM will be obvious from other embodiments, so that the corresponding flow chart is omitted.

Embodiment 5

Figure 20:
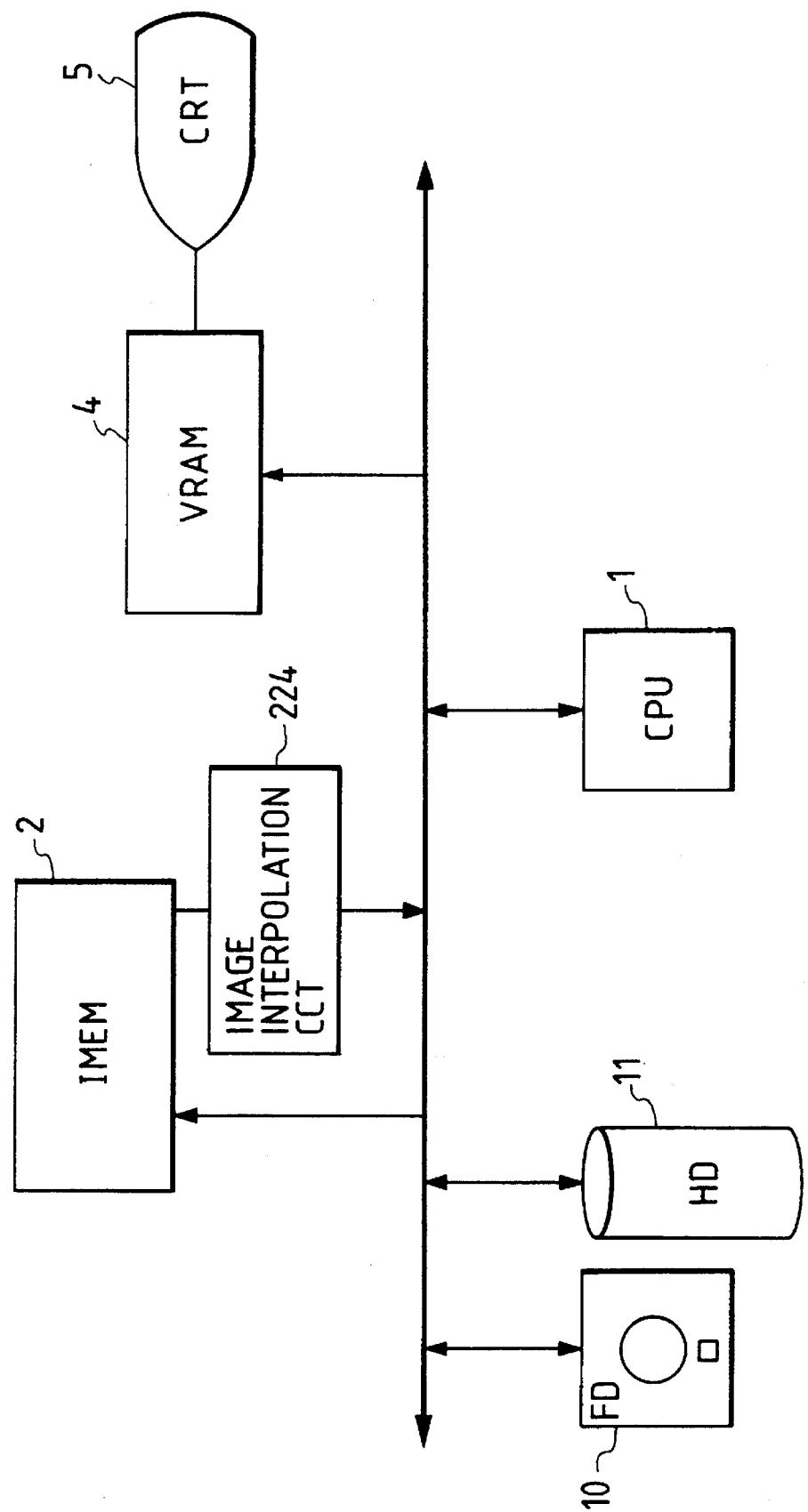
FIG. 20 is a block diagram showing the principal circuit configuration of an embodiment 5 of the present invention.
Figure 21:
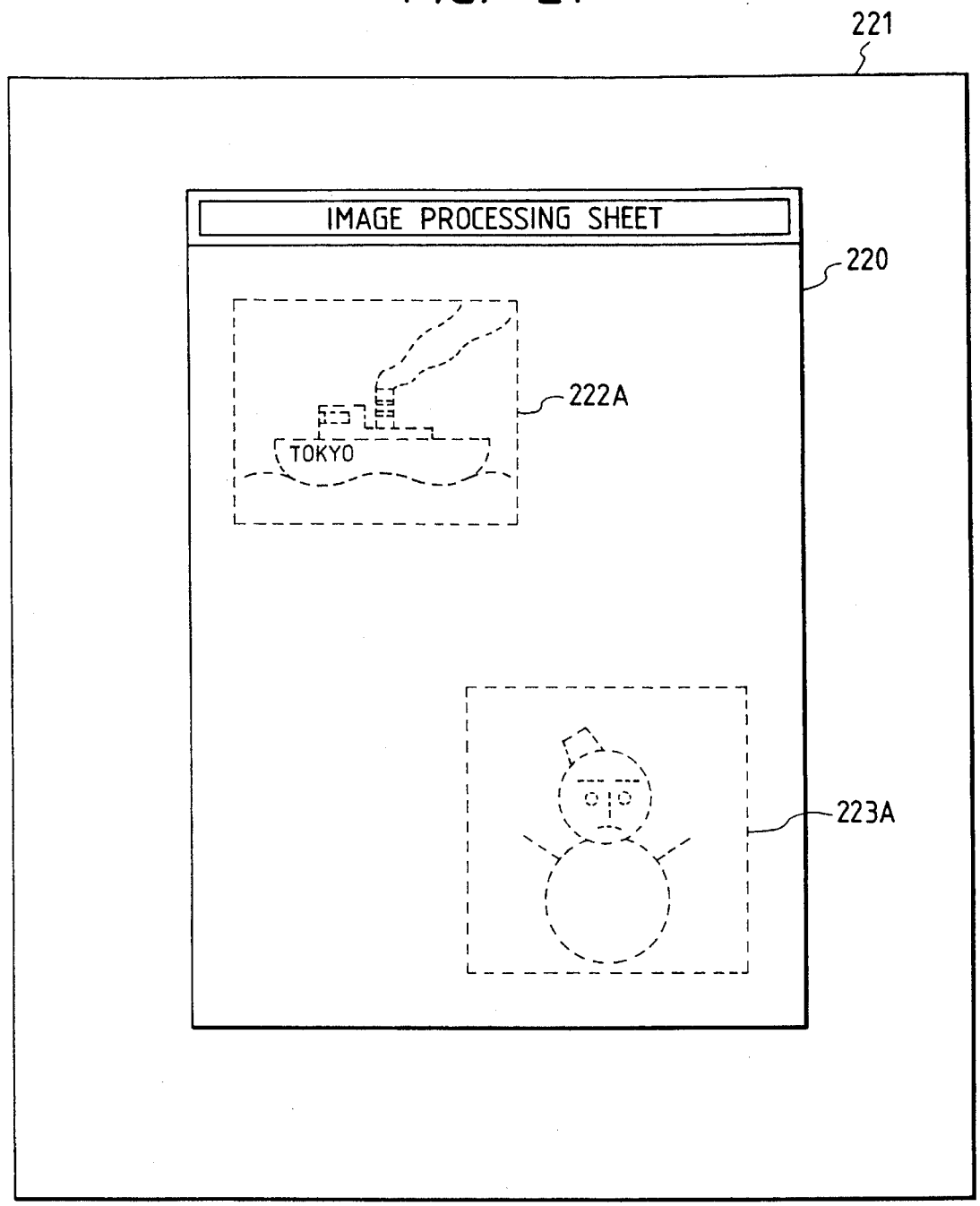
FIG. 21 is a schematic plan view of the image display state in high-speed page advancing in the embodiment 5 of the present invention.
Figure 22:
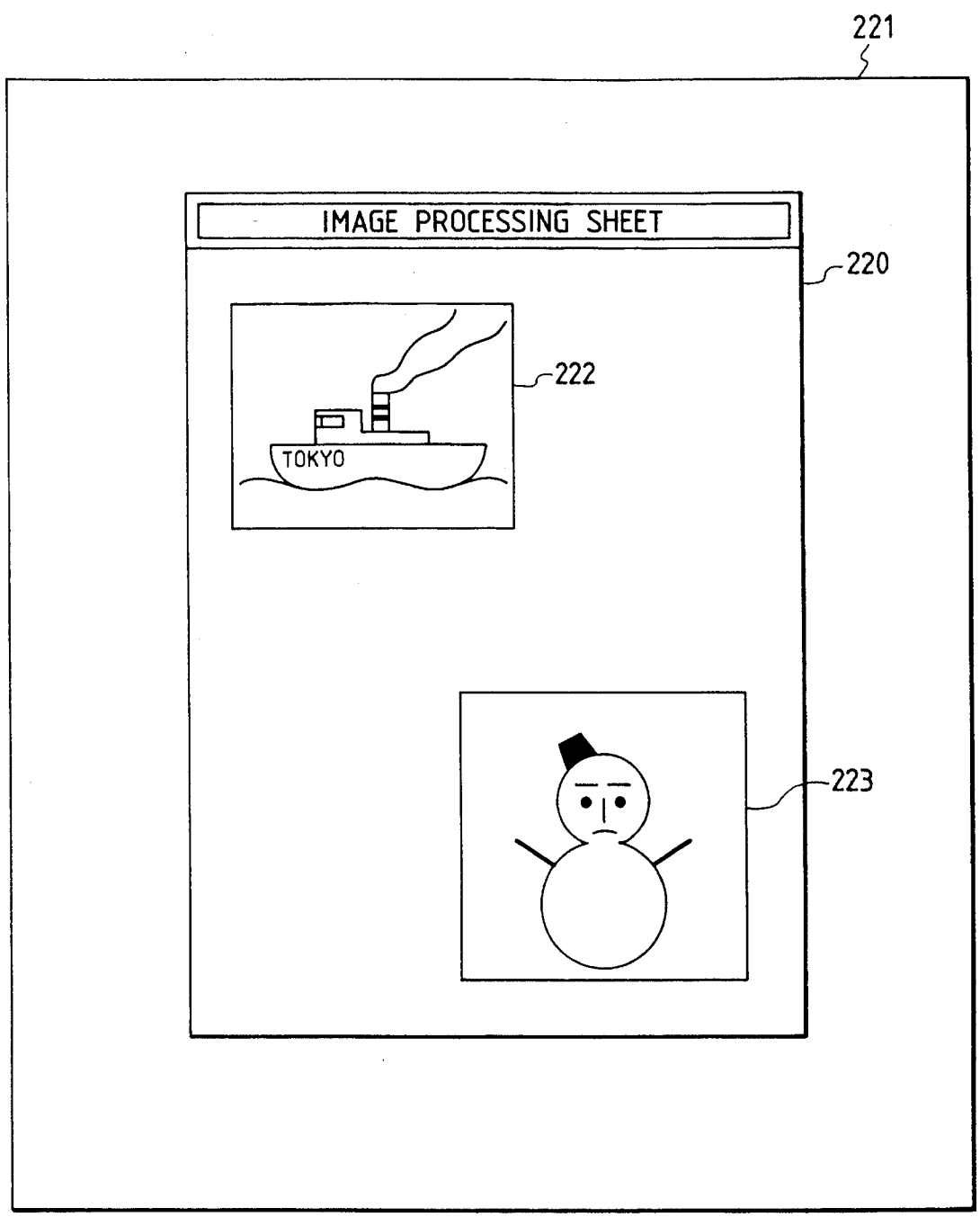
FIG. 22 is a plan view showing the image display state in an ordinary display mode for displaying an expanded image.
Figure 23:
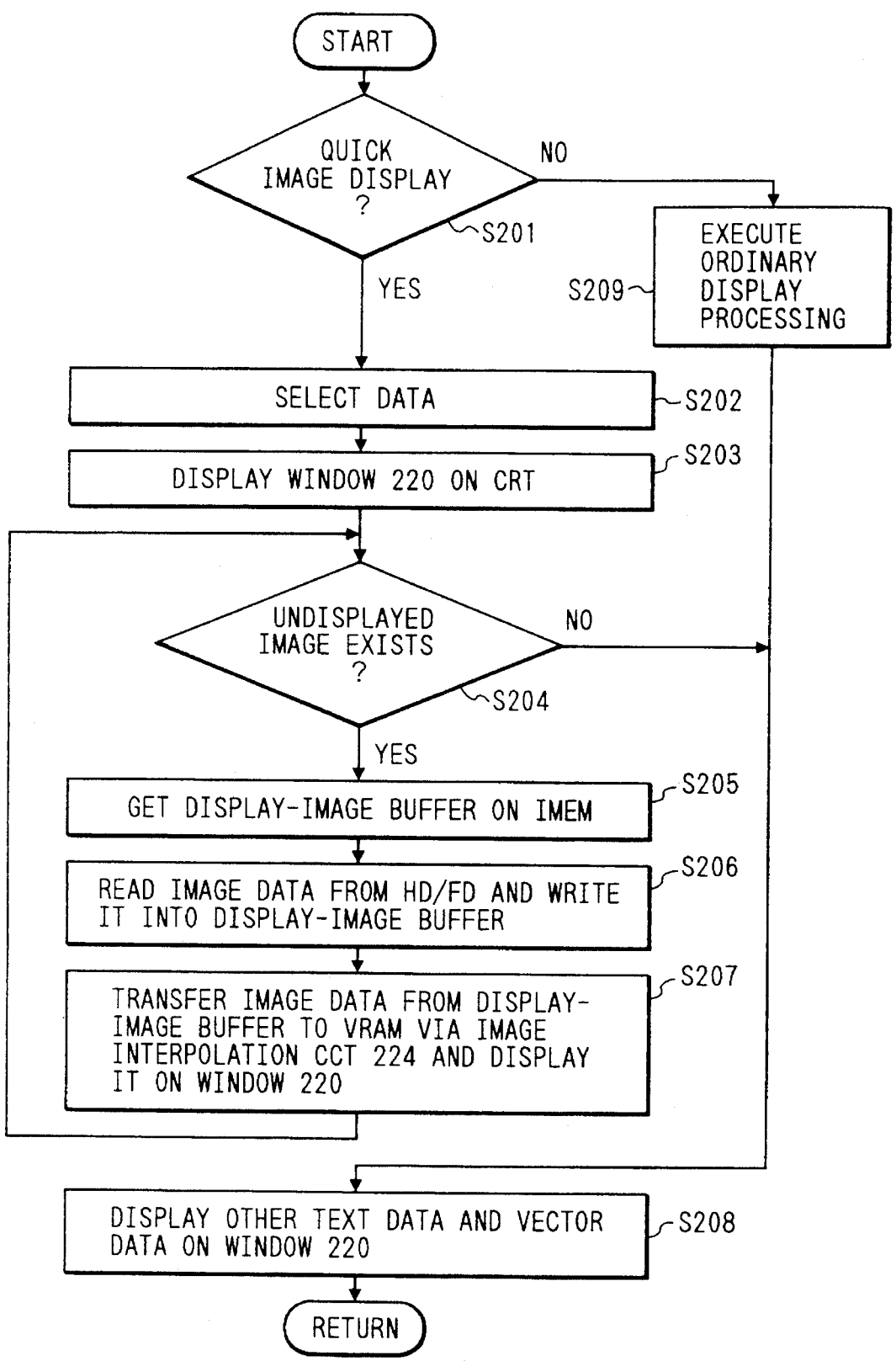
FIG. 23 is a flow chart showing the control sequence of the embodiment 5 of the present invention.

In the following an embodiment 5 of the present invention will be explained, with reference to FIGS. 20 to 25. Said embodiment 5 enables image display in the high-speed page flipping, which is difficult to achieve in the conventional technology, thereby facilitating the work. FIG. 20 shows a principal circuit structure for realizing the present embodiment; FIG. 21 shows the display state of the present embodiment, in the high-speed page flipping mode; FIG. 22 shows the image display state of the expanded image; FIG. 23 shows the operation means of the present embodiment; and FIGS. 24 and 25 show specific examples of interpolation of the present embodiment.

Figure 24:
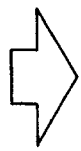
FIG. 24 is a view showing the concept of an example of the interpolation in the embodiment 5 of the present invention.
Figure 25:
FIG. 25 is a view showing the concept of another example of the interpolation in the embodiment 5 of the present invention.

In FIG. 20, an image interpolation circuit 224 for expanding the size of reduced image serves to interpolate the reduced image data of 25 dpi as shown in FIG. 24 or 25, thereby expanding the size of the image, and to send the interpolated data to the CRT 5 through the VRAM 4. It is assumed that image data of plural images, obtained for example from the scanner 14, are already converted into reduced image data of 25 dpi and encoded data, by the image compression of the JBIG method shown in FIG. 8, and are already stored in the rigid disk 11 or the floppy disk 10.

The function of the present embodiment will be explained in detail, with reference to a flow chart shown in FIG. 23. When high-speed image display (high-speed page flipping) is instructed for example from the keyboard 17 shown in FIG. 1 (step S201), the data to be displayed is selected (step S202), and an image processing sheet window 220 is displayed, as shown in FIG. 21, on the display image frame 221 of the CRT 5 (step S203). Then a display image buffer area of 25 dpi is acquired in the image memory area IMEM of the main memory 2 (step S205), and the image data to be displayed are transferred from the rigid disk 11 or the floppy disk 10 to said display image buffer (step S206). Thus the above-mentioned reduced image data of 25 dpi, separate from the encoded data, are stored in said display image buffer in the image memory area IMEM.

Then the reduced image data are transferred, from said display image buffer, through the image interpolation circuit 224 to the VRAM 4, for image display on the image processing sheet window 220 on the CRT 5 (step S207). In this operation, said image interpolation circuit 224 expands the reduced image data to the original image size, by a relatively simple interpolation such as zero value interpolation or same-value interpolation as shown in FIGS. 24 or 25, whereby images as shown in FIG. 21 are displayed in succession at a high speed, on the image processing sheet window 220.

After the image data are all transferred from the display image buffer to the VRAM 4, the sequence returns to the step S204, and the above-mentioned steps S205 to S207 are repeated if an undisplayed image exists for example in the rigid disk 11. If such undisplayed image is absent, a step S208 effects necessary post-process and the sequence returns to the main program.

If the high-speed image display is not instructed, there is executed normal image display by expanding the reduced image data of 12.5 dpi and the encoded data to the original image by the compression/expansion circuit 8 and displaying the expanded original image on the CRT 5 (step S209). In-this case the displayed image is as clear as the original image, as shown in FIG. 22.

This embodiment enables high-speed image display in simple and rapid manner, and with a limited image memory, since the image expansion process is not involved in the high-speed image display. However, the image quality is inferior, as schematically illustrated in FIG. 21, to the ordinary display obtained by the expansion process, as shown in FIG. 22, but such image quality is not a problem in practice, because, in the high-speed page flipping mode, the user only needs to identify the displayed image. In the foregoing description, the reduced image data are assumed to be of 25 dpi, but there may be employed those of 12.5 dpi.

Embodiment 6

Figure 26:
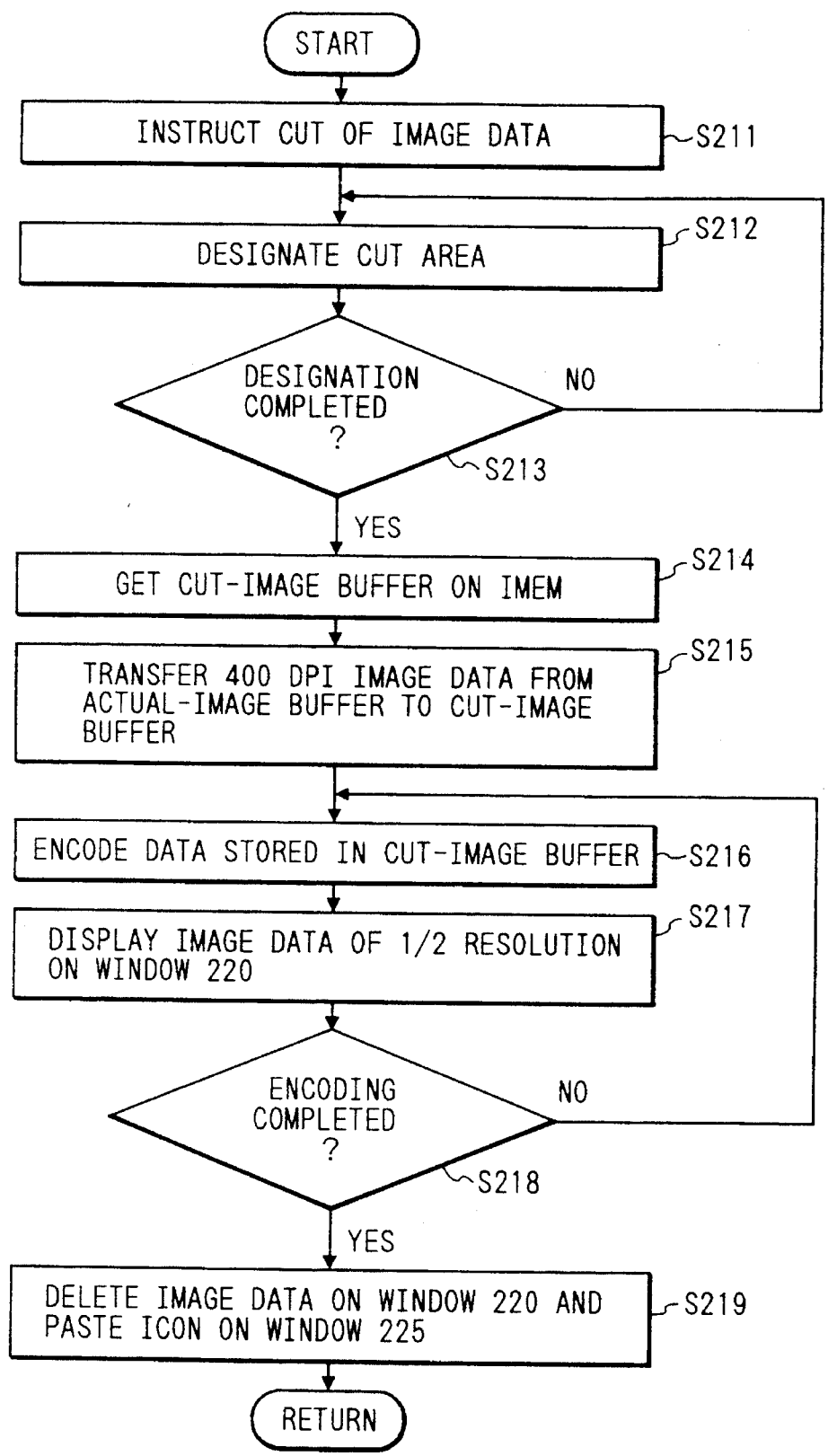
FIG. 26 is a flow chart showing the control sequence of an embodiment 6 of the present invention.
Figure 30:
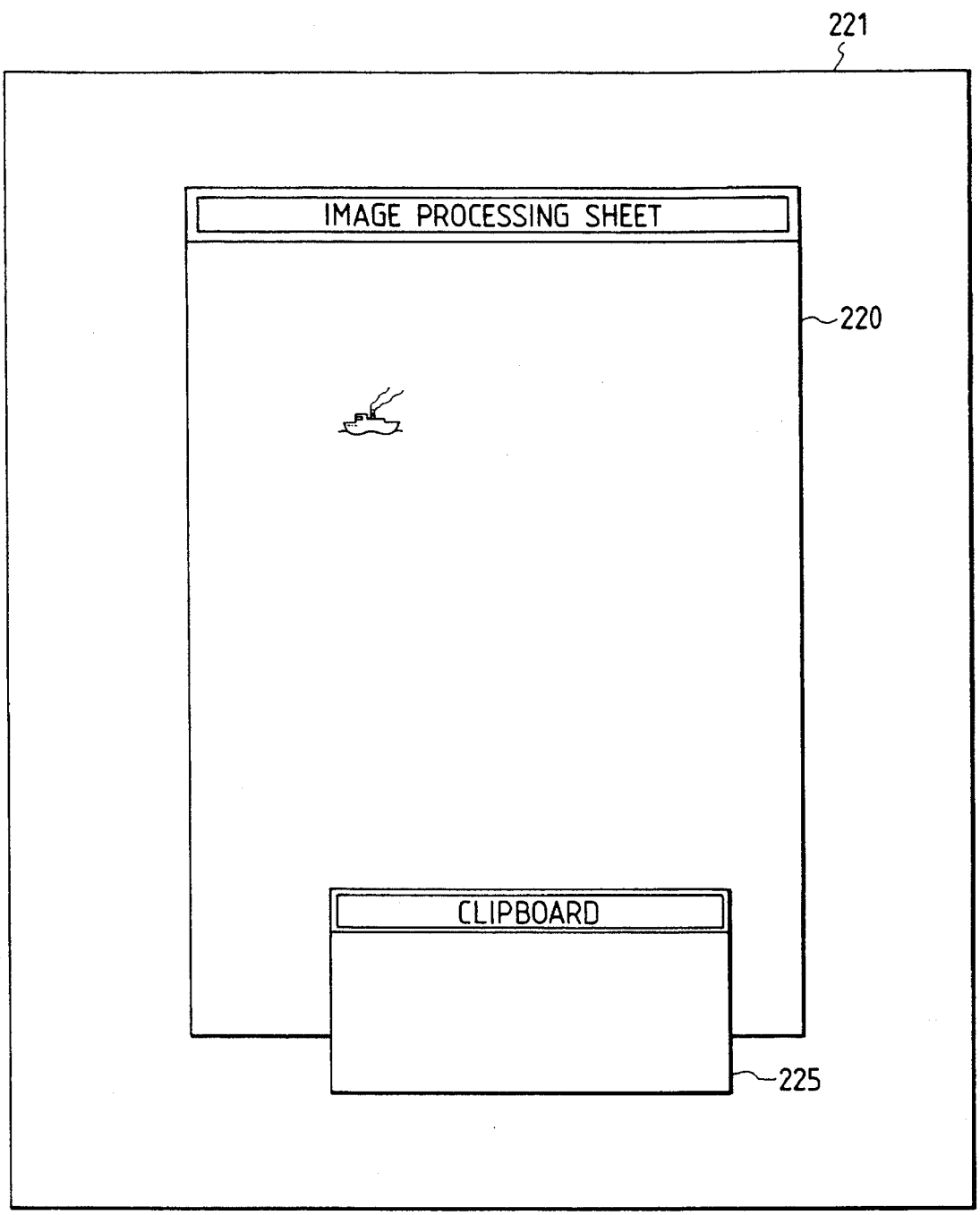
FIG. 30 is a plan view showing an example of display at the end stage of clipping process for image data in the embodiment 6 of the present invention.
Figure 31:
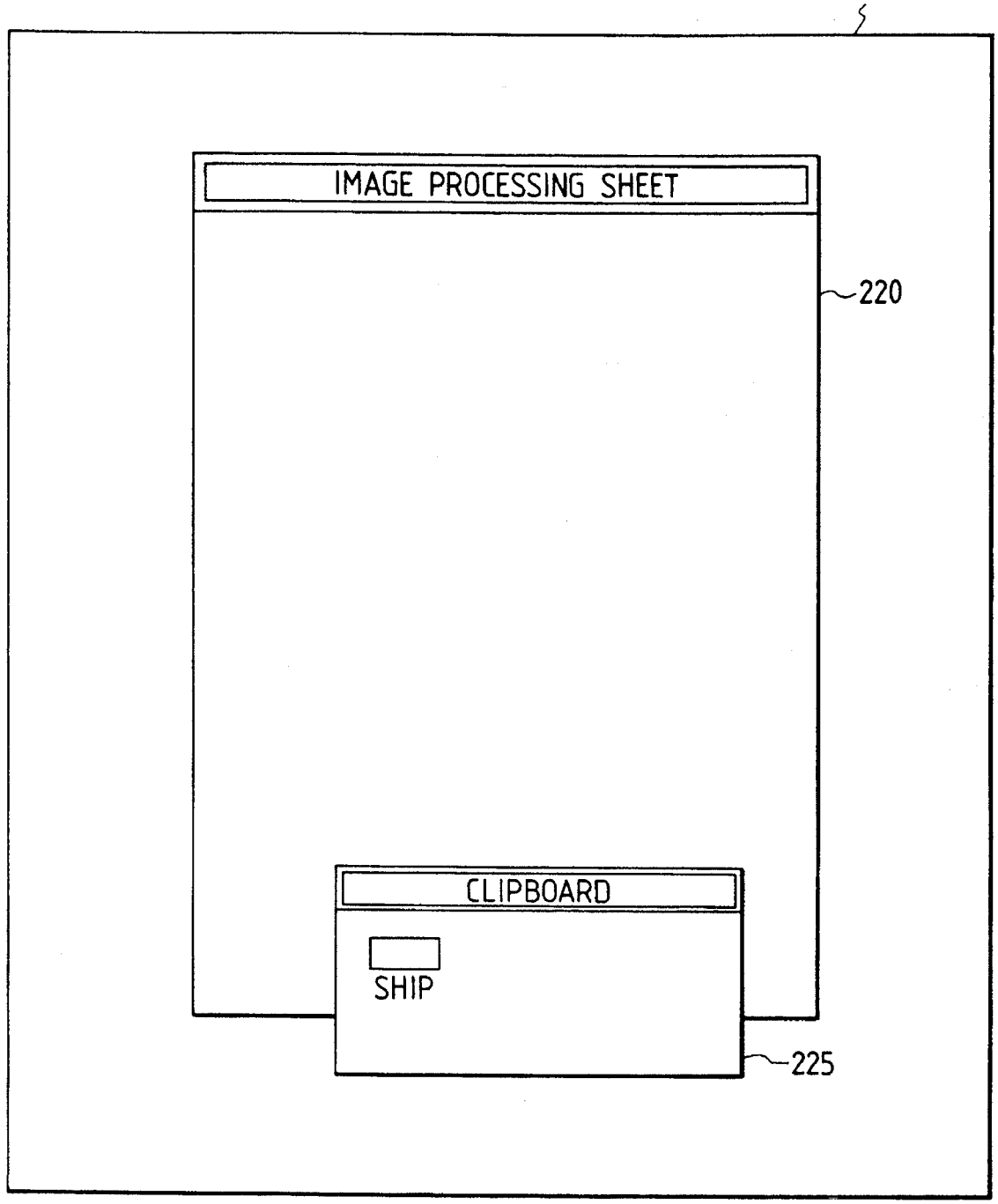
FIG. 31 is a plan view showing an example of display after the clipping process for image data in the embodiment 7 of the present invention.
Figure 32:
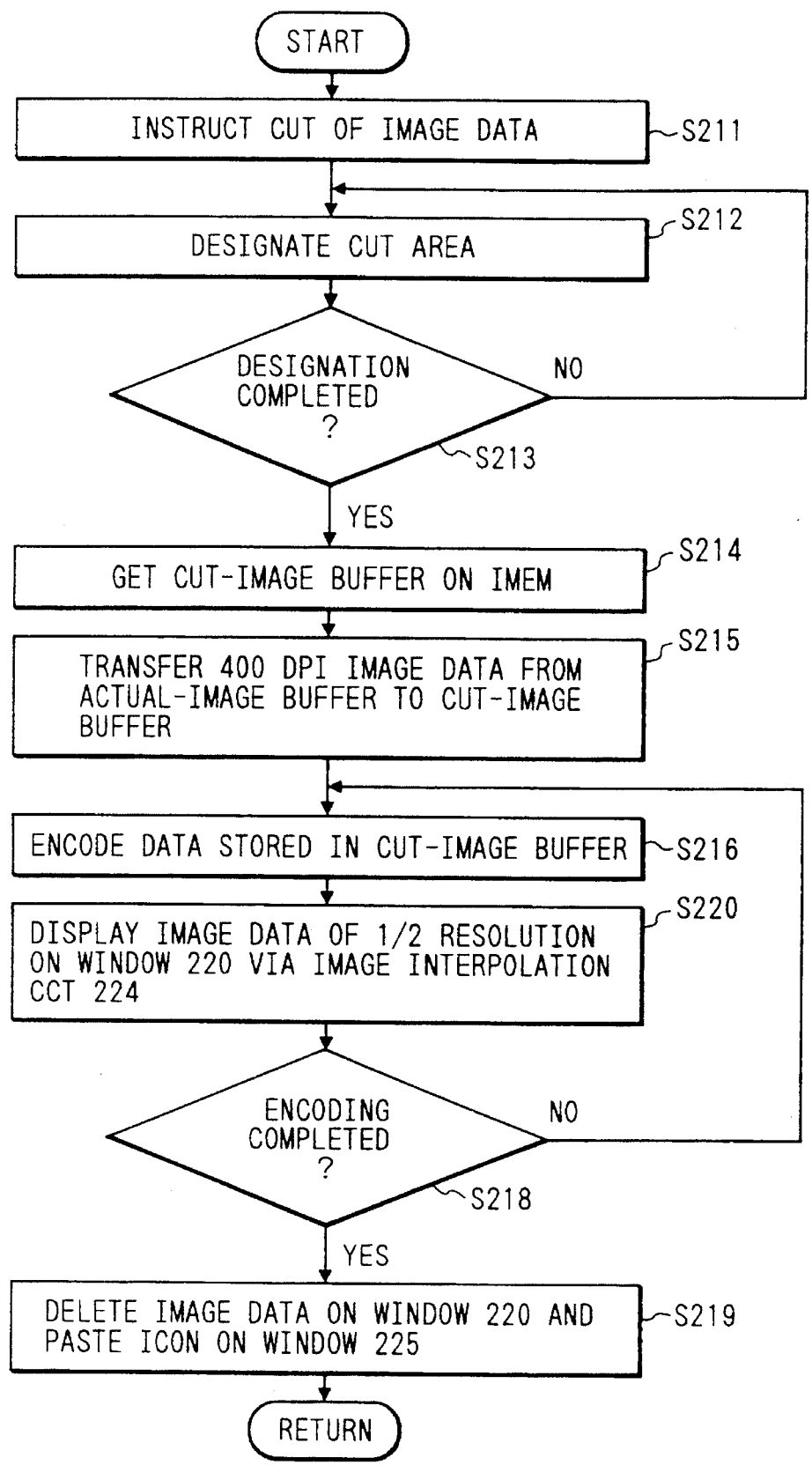
FIG. 32 is a flow chart showing the control sequence of a modification of the embodiment 6 of the present invention.

FIGS. 26 to 32 show an embodiment 6, which, in the clipping of image data, displays the stepwise reduced image data in succession and finally erases the display, thereby clearly informing the user of the proceeding of the clipping process. FIG. 26 shows the control sequence of the present embodiment, while FIGS. 27 to 31 show examples of display, and FIG. 32 shows the control sequence of a variation of the present embodiment.

Figure 27:
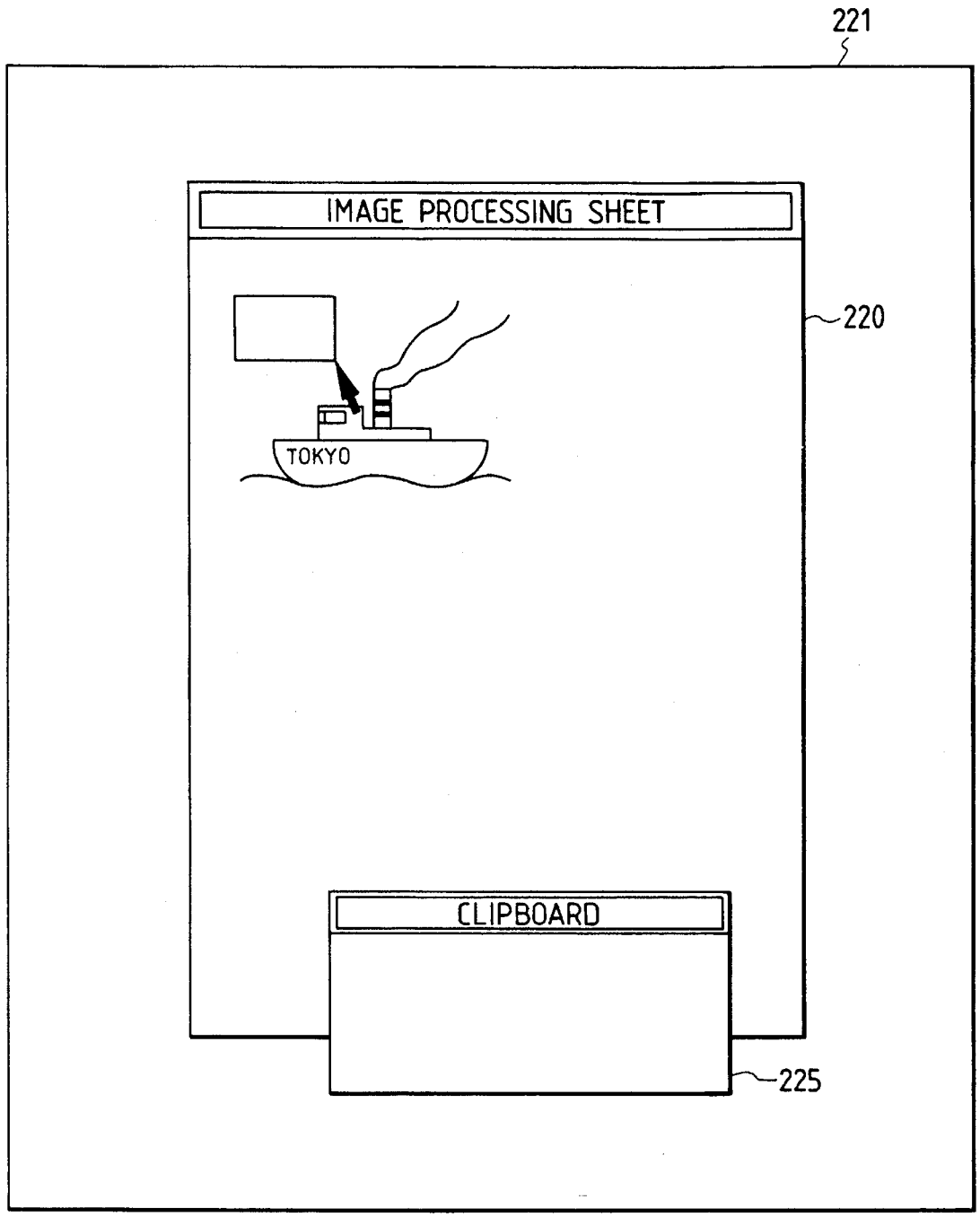
FIGS. 27 and 28 are plan views showing examples of display at the start of clipping area instruction for the image data in the embodiment 6 of the present invention.
Figure 28:
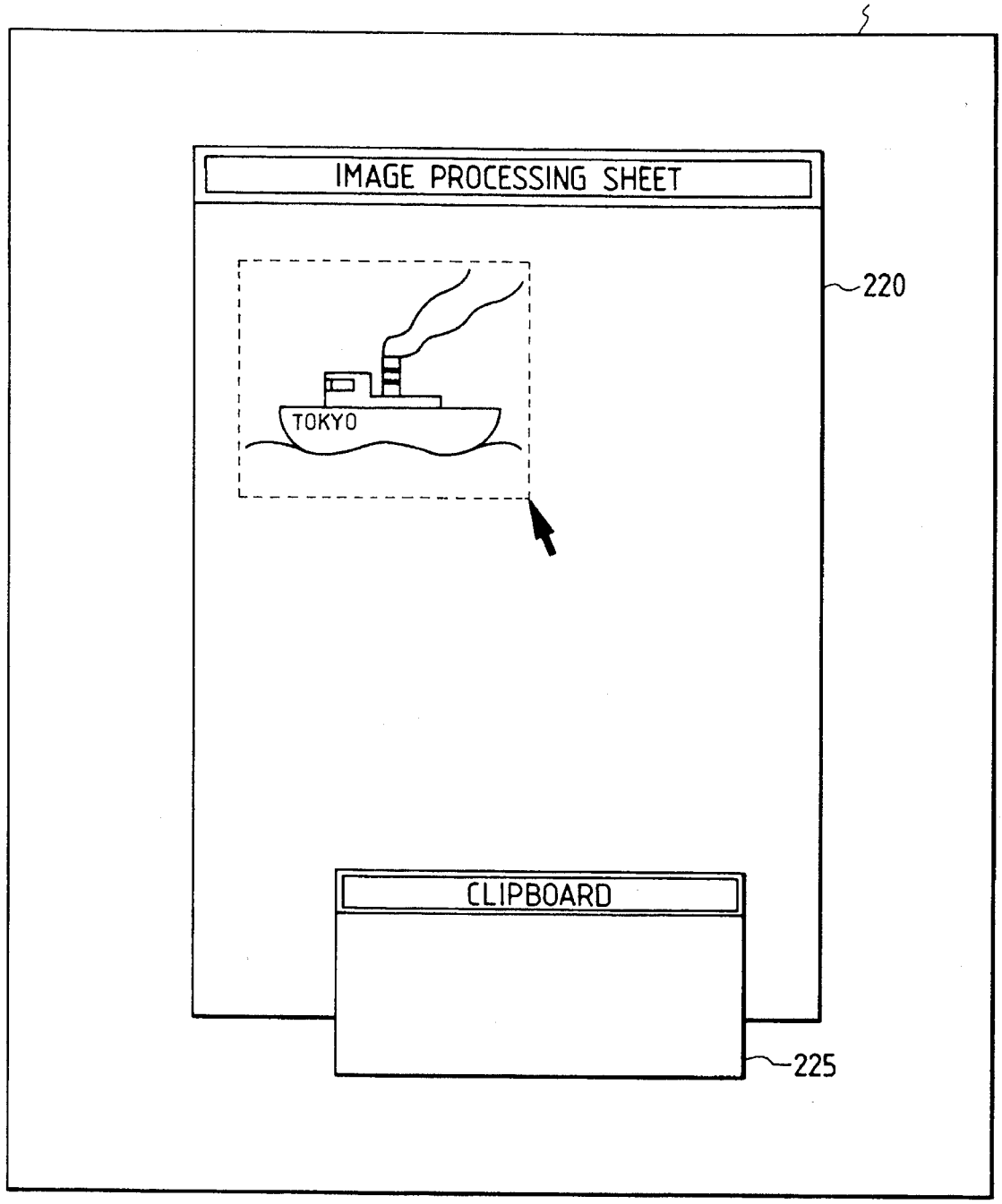

Now the function of the present embodiment will be explained in detail, with reference to a flow chart in FIG. 26. It is assumed that an image shown in FIG. 27 is displayed on the image processing sheet window 220 of the display frame 221 of the CRT 5. When image data clipping is instructed from the keyboard 17 in this state, a clipboard window 225 is displayed on the display frame 221 (step S211). Then the user designates the clipping area for example with a mouse, as indicated by a pointer P shown in FIGS. 27 and 28, and, when the clipping area designation is completed as shown in FIG. 28 (step S213), the CPU 1 acquires a clipping image data buffer area in the image memory area IMEM of the main memory 2 (step S214).

Then the image data of 400 dpi of thus designated clipping area are transferred, from the real image buffer in the image memory IMEM, to the clipping image data buffer (step S215).

Figure 29:
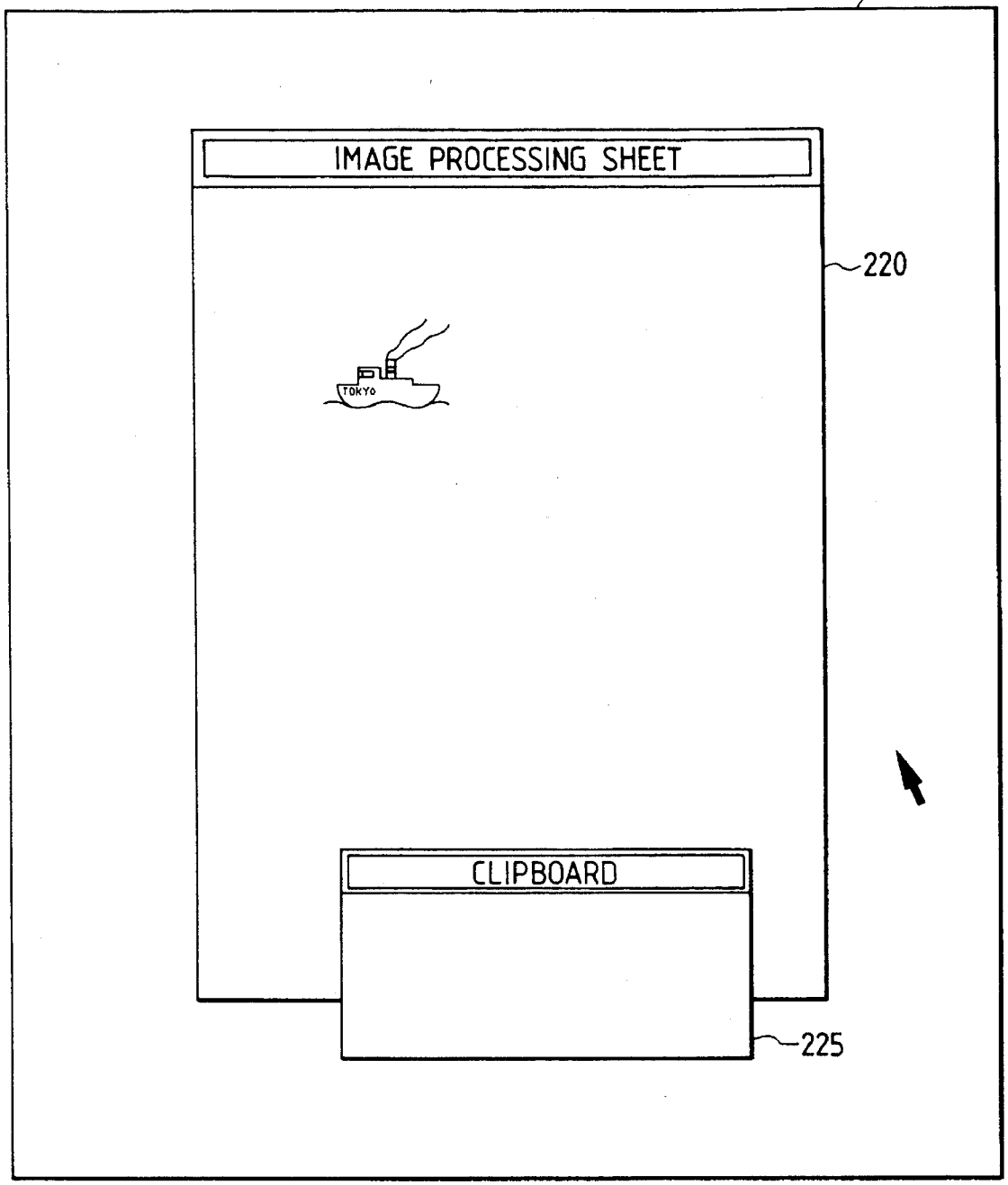
FIG. 29 is a plan view showing an example of display in the course of clipping process for image data in the embodiment 6 of the present invention.

Subsequently the data in said clipping image data buffer are compressed and encoded by the compression/expansion circuit 8 according to the JBIG method shown in FIG. 8, thereby initially obtaining the reduced image data (200 dpi) and encoded data of a first stage (step S216). Said reduced image data are written by overlay into the clipping image data buffer, and are also transferred to the VRAM 4 for display on the CRT 5. Thus image data with a resolution of ½ are displayed on the image processing sheet window 220 (step S217). The above-explained steps S216 and S217 are repeated until the completion of the stepwise encoding. With such compression encoding, the image resolution varies in the steps of 400 dpi, 200 dpi, 100 dpi, 50 dpi, 25 dpi and 12.5 dpi, and the image size is also reduced to ¼ with a reduction of ½ in the resolution. Consequently the image for clipping (a ship image in this case) displayed on the image processing sheet window 220 is reduced in size, as shown in FIGS. 28, 29 and 30, corresponding to the process stage of the compression encoding, so that the user can clearly understand the progress of the clipping process.

When the encoding is completed (step S218), the final reduced data are stored in the clipboard, then the image on the image processing sheet window 220 is erased as shown in FIG. 31, and the clipped reduced image of 12.5 dpi is pasted as an icon, on the clipboard window 225 through the VRAM 4 (step S219). Thereafter the control sequence returns to the main flow. Thus the user can immediately know the completion of the clipping procedure.

In the conventional technology, the image to be clipped remains displayed in its original size for several seconds to about twenty seconds until the completion of the clipping procedure, and said image is suddenly erased upon said completion. Consequently the use is unable to comprehend the progress of the clipping procedure and finds difficulty in maintaining the work. On the other hand, the present embodiment displays the reduced images in succession is smaller sizes, and the above-mentioned inconvenience can therefore be resolved.

FIG. 32 shows the control sequence of a variation of the embodiment 6, and the difference of said variation lies in a fact that, in a step S220 next to the step S216, an image of a resolution of ½ is displayed on the image processing sheet window 220 through the image interpolation circuit 224 as shown in FIG. 20. Consequently, in said variation, the displayed image, instead of being reduced in size as shown in FIGS. 29 and 30, remains same in size as shown in FIG. 21 but becomes stepwise thinner and vanishes at the completion of encoding (step S219). It will be apparent that this variation provides the same effect as in the foregoing embodiment.

Embodiment 7

Figure 33:
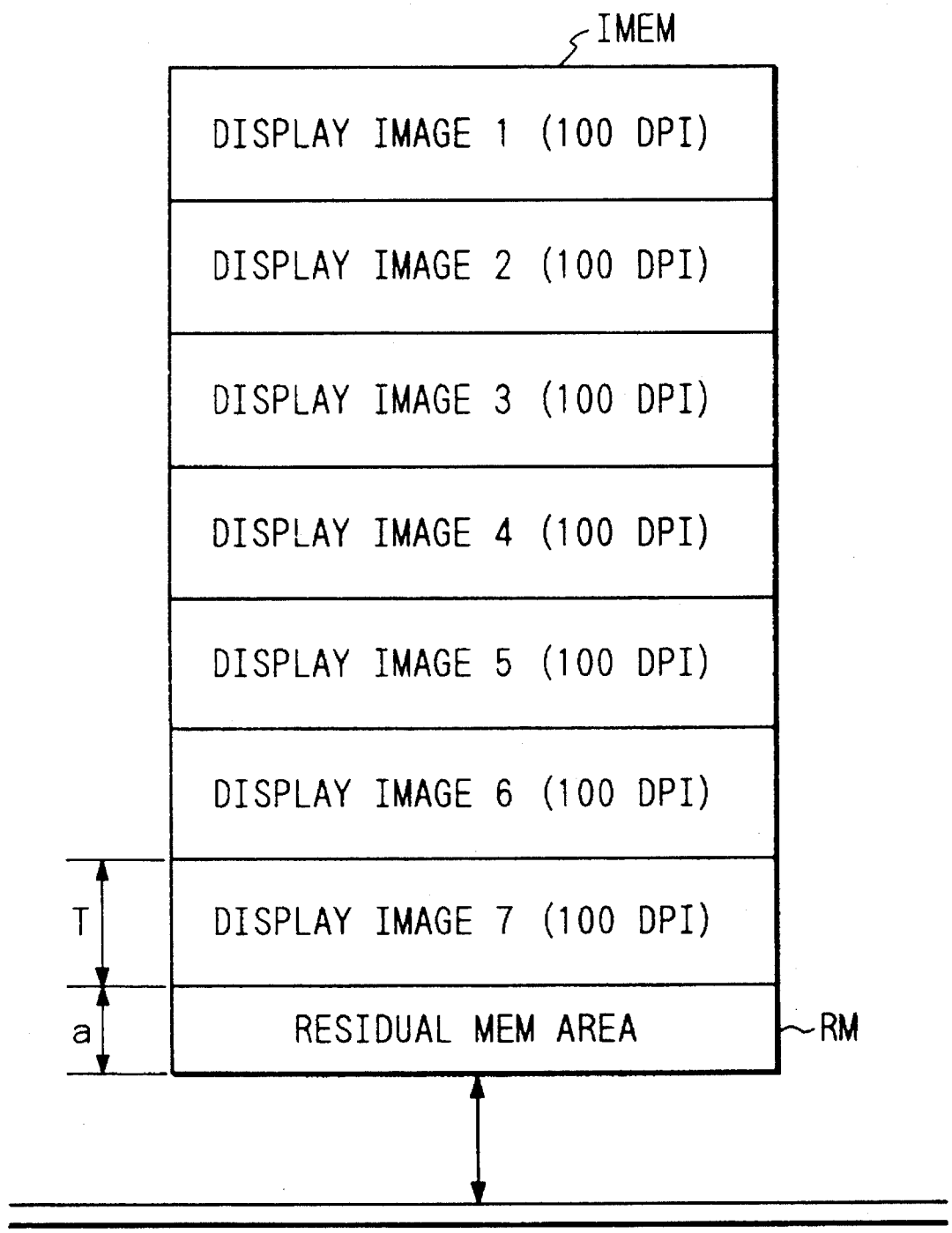
FIG. 33 is a memory map chart showing an example of the display image buffer to be employed in an embodiment 7 of the present invention.

FIGS. 33 to 37 show an embodiment 7 of the present invention. In this embodiment, even when the capacity a of the residual memory area RM of the display image buffer acquired in the image memory IMEM of the main memory 2 becomes smaller than an image frame capacity T as shown in FIG. 33, the display of at least another image is rendered possible, thereby achieving effective utilization of the memory and improvement in the work efficiency.

Figure 34:
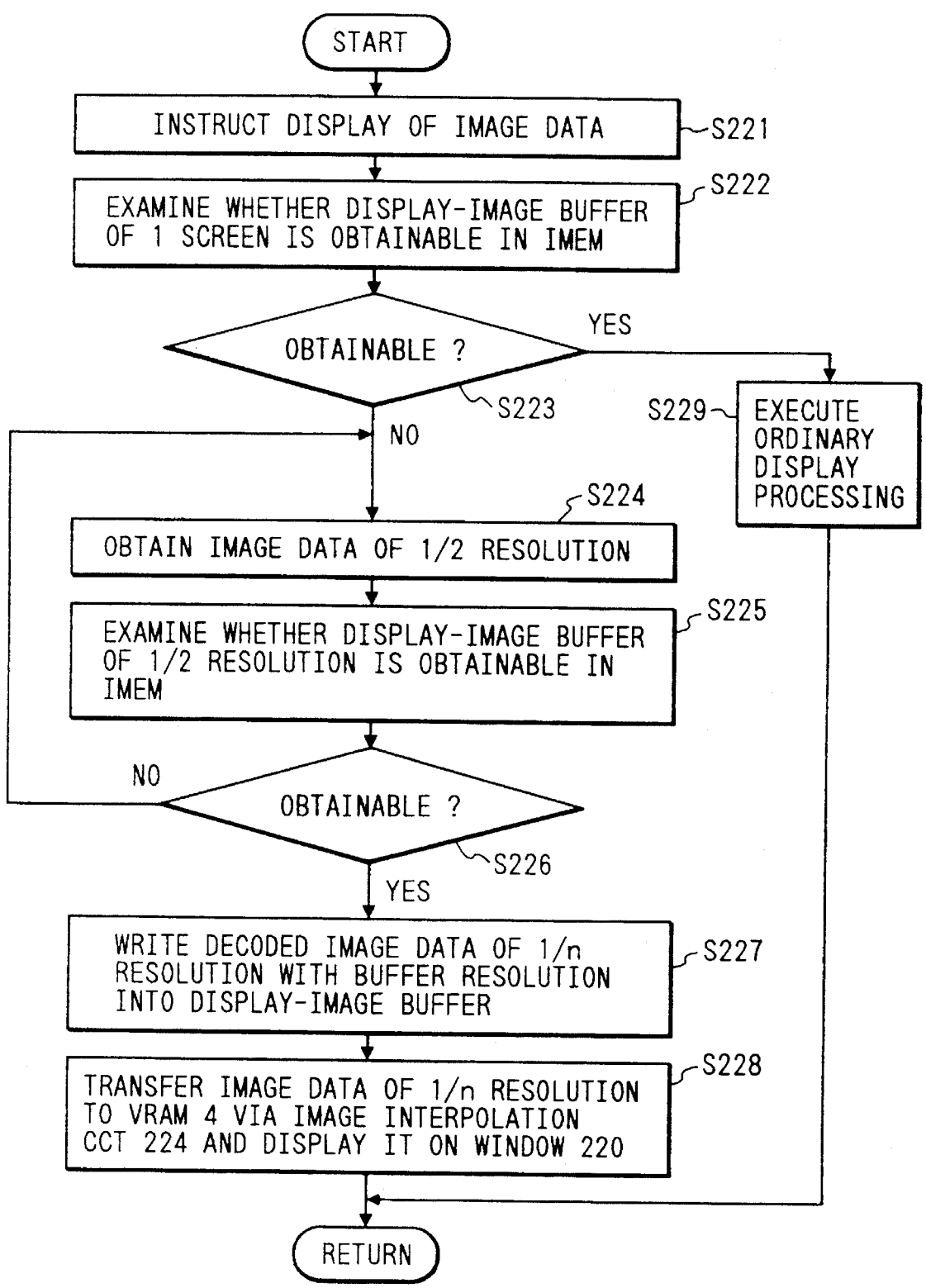
FIG. 34 is a flow chart showing the control sequence of an embodiment 7 of the present invention.

At first reference is made to a flow chart shown in FIG. 34, for explaining an example of the function of the present embodiment. When an instruction for the image data display is given from he keyboard 17 (step S221), there is discriminated whether the display image buffer of an image frame can be acquired in the display image buffer area of the image memory IMEM (step S222), by comparing the capacity a of the above-mentioned residual memory area RM with a capacity T required for an image frame. If $a \geq T$, indicating that said display image buffer can be acquired (step S223), there is executed the ordinary image display process of storing the display image data of a new image frame of 100 dpi in said display image buffer and displaying said data on the CRT 5 through the VRAM 4 (step S229), and then the sequence returns to the main routine.

Figure 35:
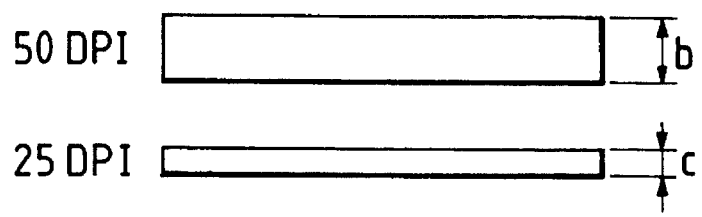
FIG. 35 is a schematic view showing an example of the size of reduced image data processed in the embodiment 7 of the present invention.

In case of $a < T$, indicating that the display image buffer for an image frame cannot be acquired, the sequence proceeds to a step S224 for obtaining an image with a resolution of ½. More specifically, the reduced image data of 12.5 dpi and the encoded data of the JBIG method are supplied from the rigid disk 11 or the floppy disk 10 to the compression/expansion circuit 8 and are subjected to the JBIG expansion to obtain reduced image data of 50 dpi (step S224). Then there is discriminated whether a display image buffer for an image frame with a resolution of ½ can be acquired. More specifically, as shown in FIG. 35, the capacity b required for the reduced image data of 50 dpi is compared with the capacity a of the residual area RM, and said acquisition is identified possible or impossible respectively if $b \leq a$ or $b > a$.

If said acquisition is identified impossible (step S226), the above-mentioned steps S224 and S225 are repeated until said acquisition becomes possible. More specifically, in a second cycle, reduced image data of 25 dpi are prepared in the compression/expansion circuit 8, then the capacity c required for said reduced image data (cf. FIG. 35) is compared with the capacity a of the residual memory area RM, and said acquisition is identified possible or impossible respectively if $c \leq a$ or $c > a$.

For example if $c \leq a$, indicating that a display image buffer for an image frame of 25 dpi can be acquired in the image memory IMEM, the sequence proceeds from the step S226 to S227 for transferring, to said display image buffer, the image data of a resolution of 1/n, decoded to the resolution level of the buffer (for example reduced image data of 25 dpi). Subsequently said image data of resolution of 1/n are read from the display image buffer, enlarged to the original image size through the image interpolation circuit 224 shown in FIG. 20, and transferred to the VRAM 4, thereby displaying the image of the resolution of 1/n on the image processing sheet window 220 (cf. FIG. 22) on the CRT 5 (step S228). The interpolation in this state is executed as shown in FIG. 24 or 25, whereby the display is made with somewhat deteriorated image quality, as shown in FIG. 21. Subsequently the sequence returns to the main program. Such display is considered practically acceptable, since some deterioration in the image quality is not a problem for merely confirming the content of image. Particularly the present embodiment provides an advantage of constantly enabling to see the entire image.

Figure 36:
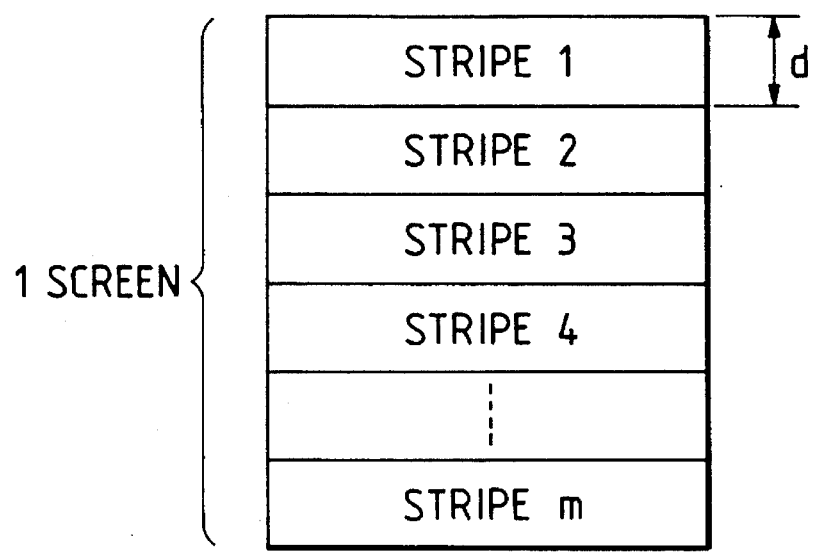
FIG. 36 is a schematic view of a striped structure of image processed in a variation of the embodiment 7 of the present invention.
Figure 37:
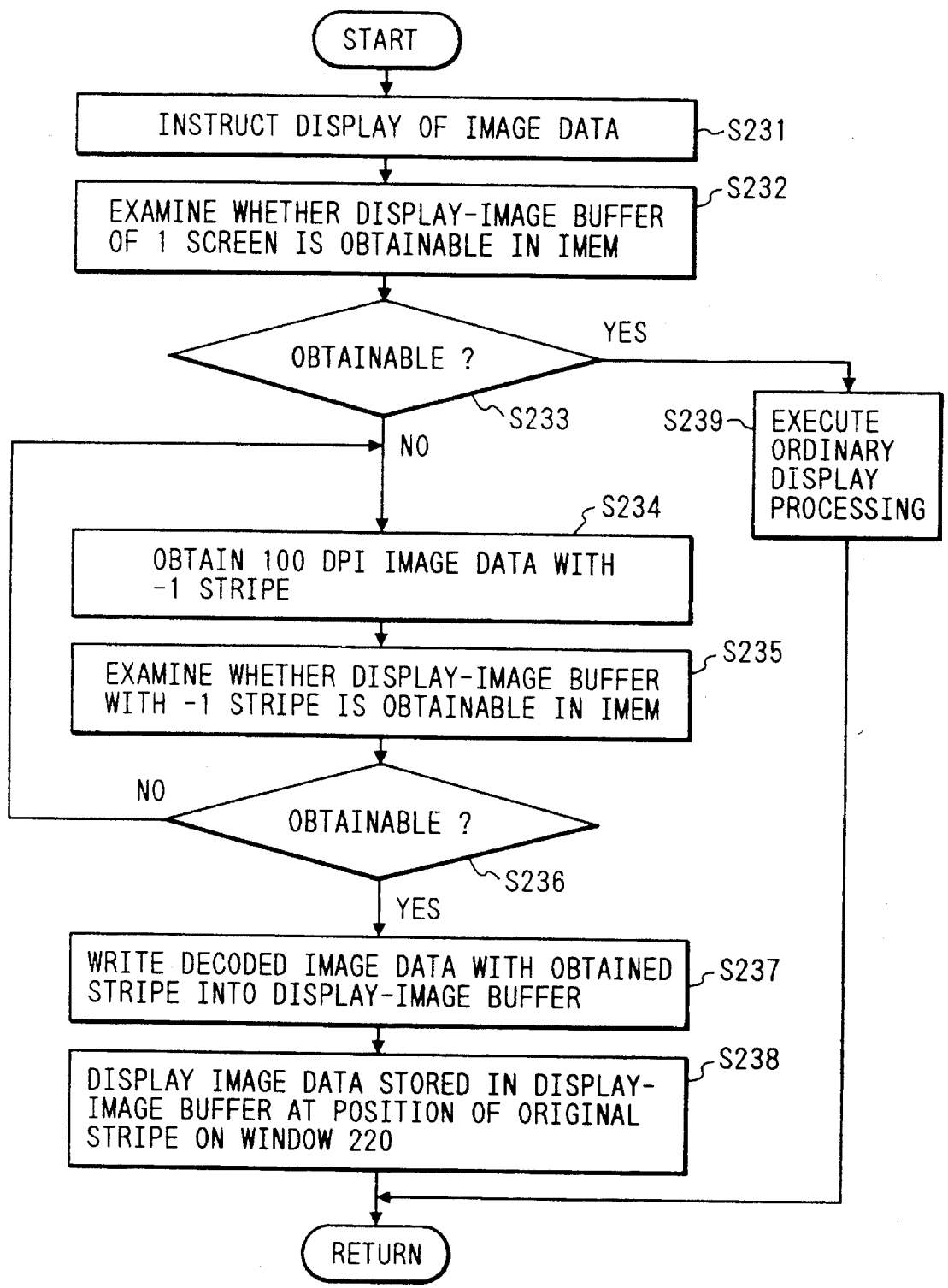
FIG. 37 is a flow chart of the control sequence of a variation of the embodiment 7 of the present invention.

FIGS. 36 and 37 show a variation of the embodiment 7. In order to facilitate the sequence process in consideration of the scanner 14 etc., the image data of an image frame are usually divided into m stripes at maximum, satisfying a condition $d \times m \leq T$, and the JBIG compression is executed for each stripe, and the reduced image data of 12.5 dpi and the encoded data are stored in the rigid disk 11 or the floppy disk 10. The present embodiment is to display image data of an image frame, utilizing the combination of m 1 stripes at maximum according to the capacity a of the residual memory area RM, without reducing the resolution from 100 dpi.

This embodiment will be explained in the following, with reference to a flow chart shown in FIG. 37. Steps S231–S233 and S239 will not be explained as they are similar to the steps S221–S223 and S229 in FIG. 34. At first, if a step S233 identifies that a display image buffer for an image frame cannot be acquired, a step S234 obtains image data of 100 dpi, which are less by one stripe than in the preceding cycle, by the compression/expansion circuit 8, based on the data from the rigid disk 11 etc. Then a step S235 discriminates whether a display image buffer, for said data reduced by one stripe, can be acquired on the image memory area IMEM. More specifically, for an i-th cycle, $(m-i) \times d$ is compared with the aforementioned capacity a of the residual memory area RM, and said acquisition is identified possible or impossible, respectively if $(m-i) \times d \leq a$ or $(m-i) \times d > a$, wherein $i=1, 2, \ldots, (m-1)$.

If the acquisition is identified impossible (step S236), the above-mentioned steps S234 and S235 are repeated until said acquisition becomes possible.

When the step S236 subsequently identifies that the acquisition is possible, the composite image data are stored in the display image buffer by an amount corresponding to the acquired stripes (step S237), and said image data in the display image buffer are displayed in the original stripe position, on the image processing sheet window 220 (cf. FIG. 22) on the CRT 5 (step S238). Subsequently the sequence returns to the main routine.

The order of selection of stripes in the step S234 can be variously considered according to the nature of the image. For example, if important image information is concentrated in the upper part of the image frame (for example a control chart), the stripes may be discarded from the lower part of the image frame. In case the important image information is concentrated in the center of the image frame (for example a design chart), the stripes may be discarded alternately from the upper and lower parts so as to leave the central stripes to the last. Consequently the image displayed on the CRT 5 in the step S238 shows the important image portions by a combination of stripes. The present embodiment provides an advantage of displaying the image with a resolution of 100 dpi which is same as the resolution of the CRT 5, and the present embodiment does not require the image interpolation circuit 224.

The above-explained embodiment repeats the steps S224 and S225 (or steps S234 and S235) until the display image buffer is acquired, but it is also possible to determine, in one operation, the resolution of 1/n (or number i of stripes) through the comparison of the capacity a of the residual memory area RM with a predetermined capacity $e_i$ for each resolution (or comparison of the capacity a with $n \times i$).

Also the step S228 in FIG. 34 displays the image through the image interpolation circuit 224, but it is also possible to automatically decide the display according to the resolution, for example to display the image data of 100 dpi expanded by the compression/expansion circuit 8 in case of a very low resolution, and to effect the display without image interpolation in case the resolution is relatively high.

As explained in the foregoing, the present embodiment enables image display even in case of capacity deficiency of the display image buffer area, thereby improving the operating efficiency.

Embodiment 8

In the hierarchical encoding of image data by the JBIG method, following process enables further efficient utilization of memory and further improvement in the process efficiency.

Figure 38:
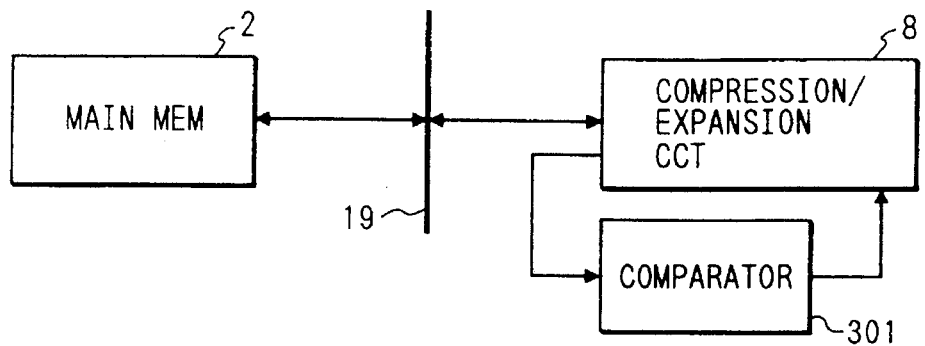
FIG. 38 is a block diagram of another example of the compression/expansion circuit.
Figure 39:
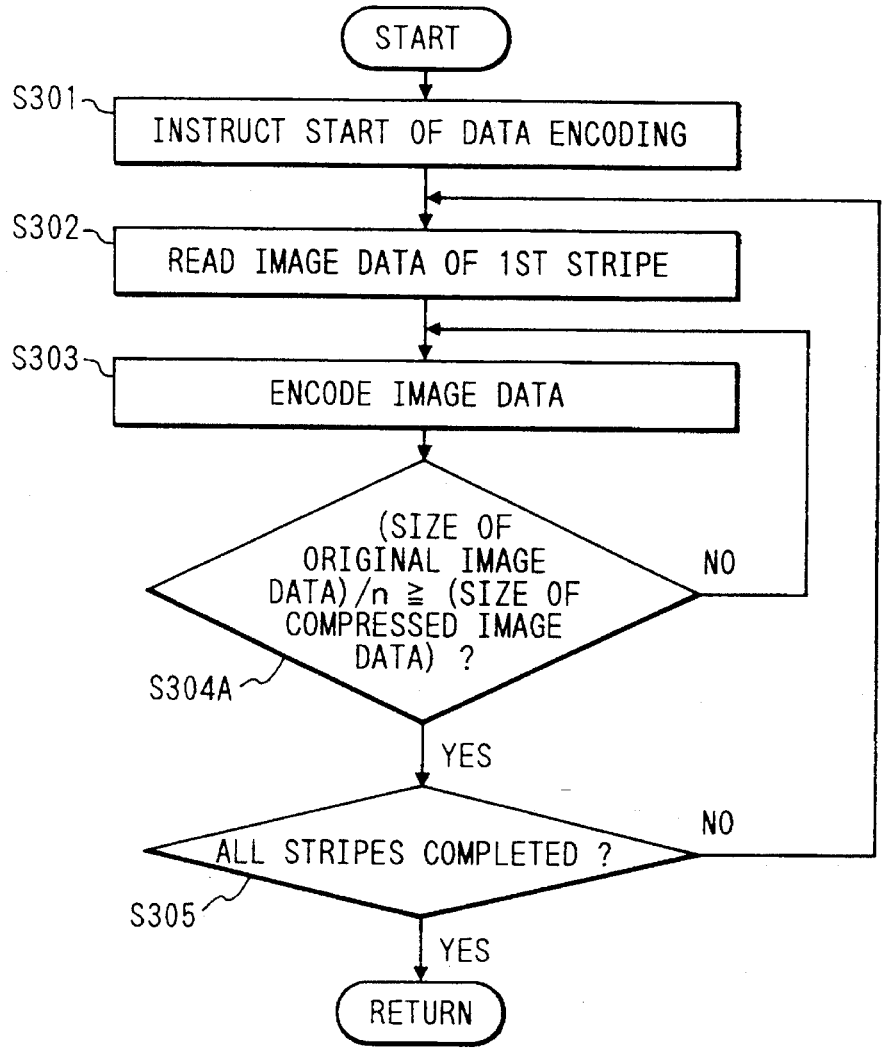
FIG. 39 is a flow chart of an operation for regulating the number of compressions.
Figure 40:
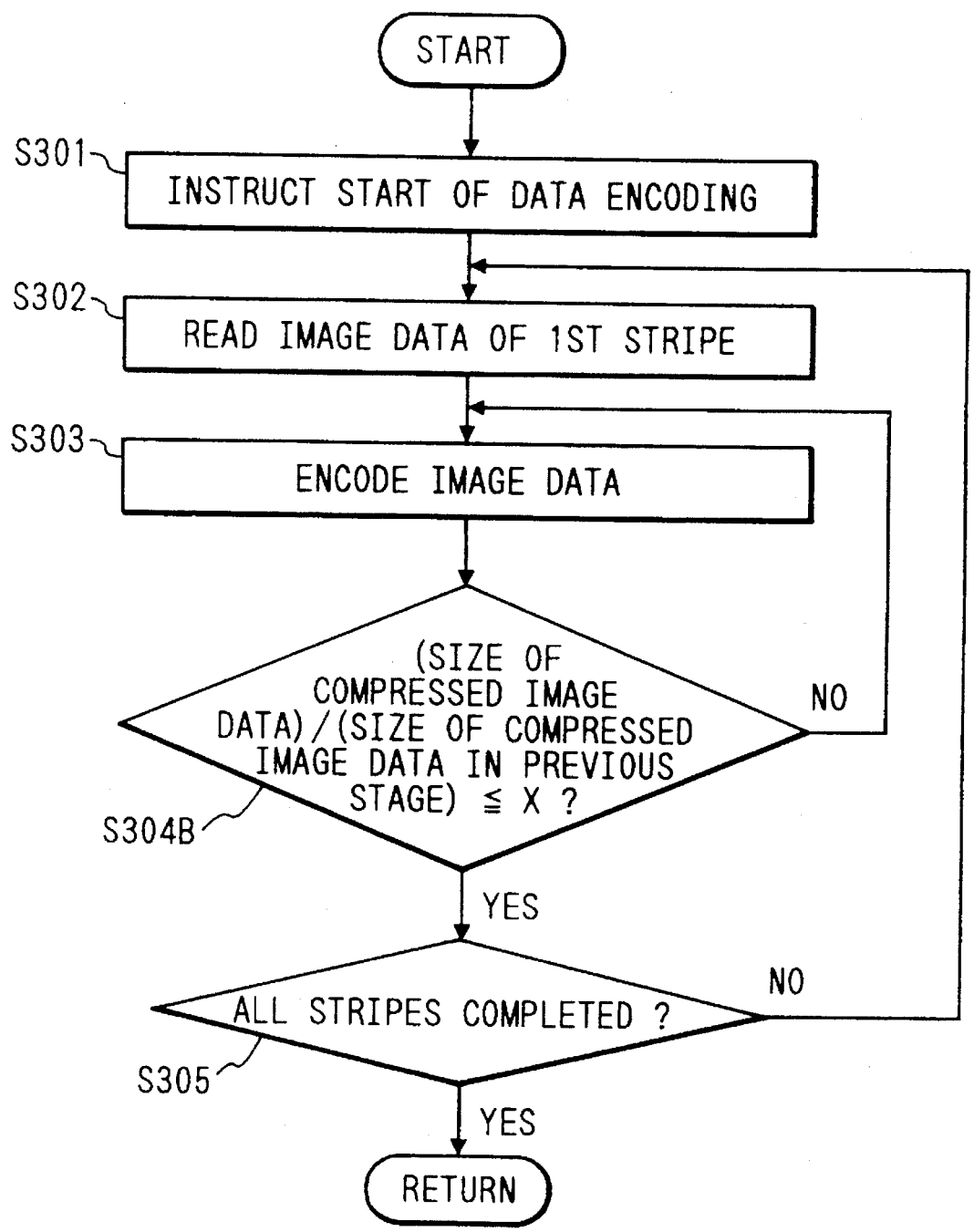
FIG. 40 is another flow chart of the operation for regulating the number of compressions.

The original image data (400 dpi) stored in the main memory 2 (FIG. 38) are divided into horizontally oblong plural stripes (areas) arranged in the vertical direction, and said original image data are hierarchically encoded by the compression/expansion circuit 8 for each stripe in the main memory 2. Based on the data in a stage in the course of said encoding, a comparator 301 effects a comparison:

(1) original image data size/n≦compressed image size (compressed image data size of said stage+encoded data to said stage); or (2) (compressed data size/compressed data size in preceding stage)≦X, (for example n=2–1000, X=0.5–0.99), and the encoding process for the stripe is terminated at this stage when the above-mentioned condition is satisfied. This is based on a fact that the additional hierarchical encoding does not provide significant (effective) reduction of the compressed data and that there can be economized the memory capacity consumed in the additional encoding. Flow charts shown in FIGS. 39 and 40 show the process in the compression/expansion circuit 8, respectively corresponding to the above-mentioned comparisons (1) and (2). A step S301 receives, from the CPU 1, an instruction for starting the encoding for the original image data of 400 dpi in the main memory 2. Then a step S302 reads the image data of a first stripe from the main memory 2, and a step S303 effects the encoding of a first stage on thus read image data. Then a step S304A (FIG. 39) or S304B (FIG. 40) discriminates the signal indicating the result of process (1) or (2) by the comparator 301, and, if NO (condition (1) or (2) being not satisfied), the sequence returns to the step S303 for effecting the encoding of a next stage on said stripe. In case of YES (condition (1) or (2) being satisfied), the encoding for said stripe is terminated. Then the sequence proceeds to a step S305 for discriminating whether the hierarchical encoding has been completed for all the stripes of the-original image data in the main memory 2, and the steps S302 to S304A/B are repeated until such encoding is completed.

Figure 41:
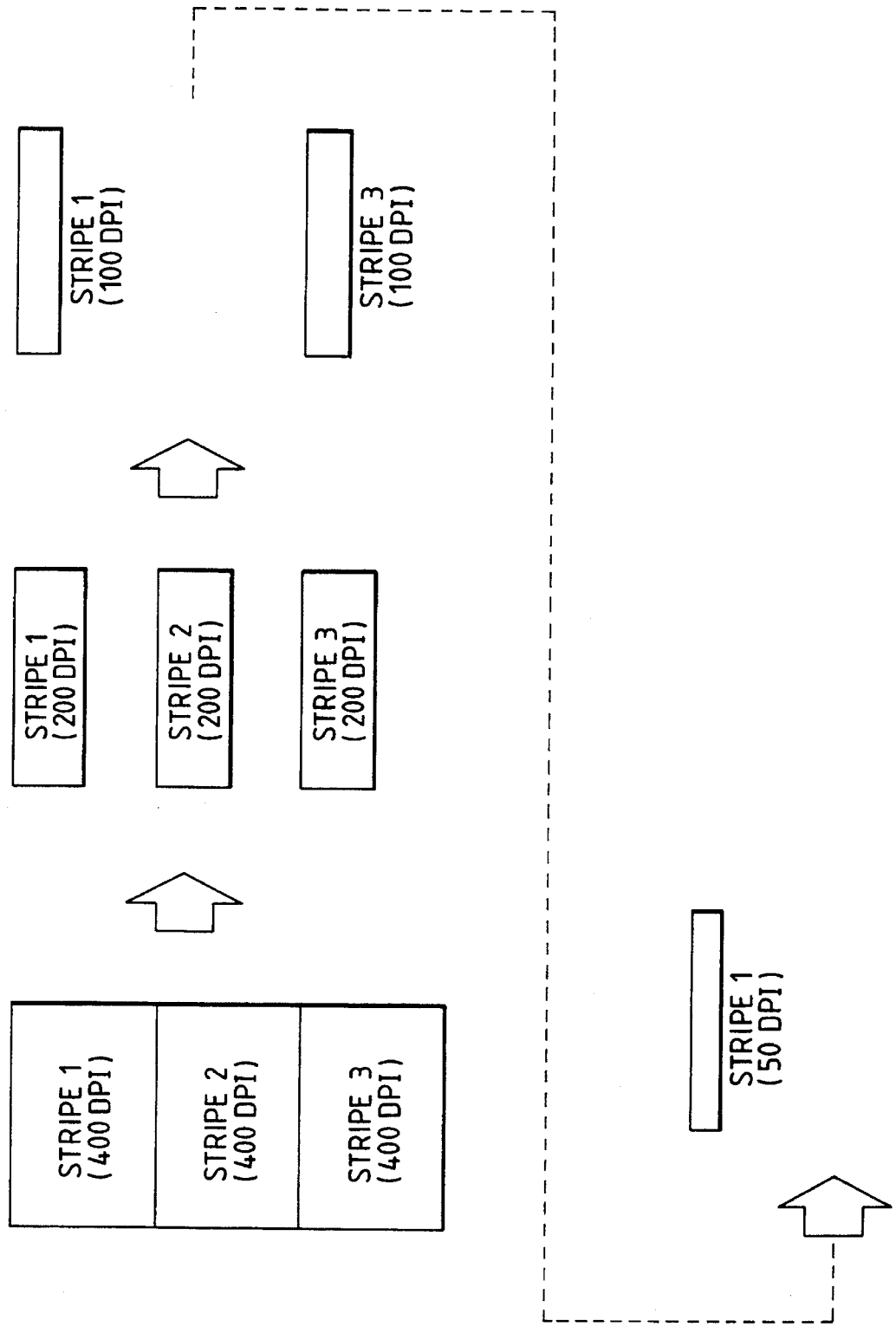
FIG. 41 is a view showing the mode of compression for individual stripe.

FIG. 41 shows the different process stages for the stripes, attained through the above-explained procedure. The process is completed at the 4th stage for the stripe 1, 2nd stage for the stripe 2, and 3rd stage for the stripe 3.

Embodiment 9

In the image clipping of the image displayed on the CRT 5, and in the pasting of a clipped image onto other suitable text data, the following process under the control of the CPU 1 enables further improved utilization of the memory.

Figure 42:
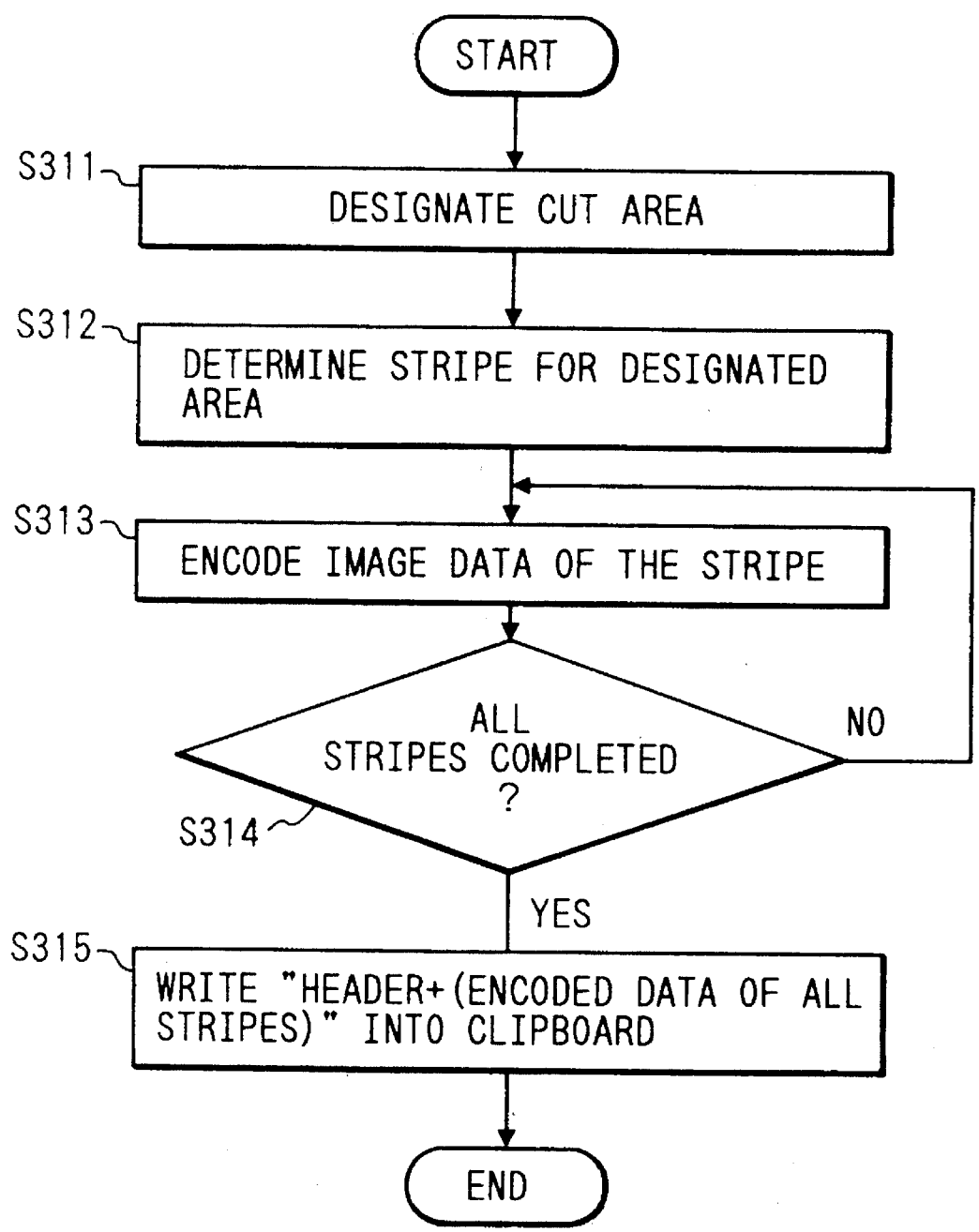
FIG. 42 is a flow chart for a clipping operation.
Figure 43:
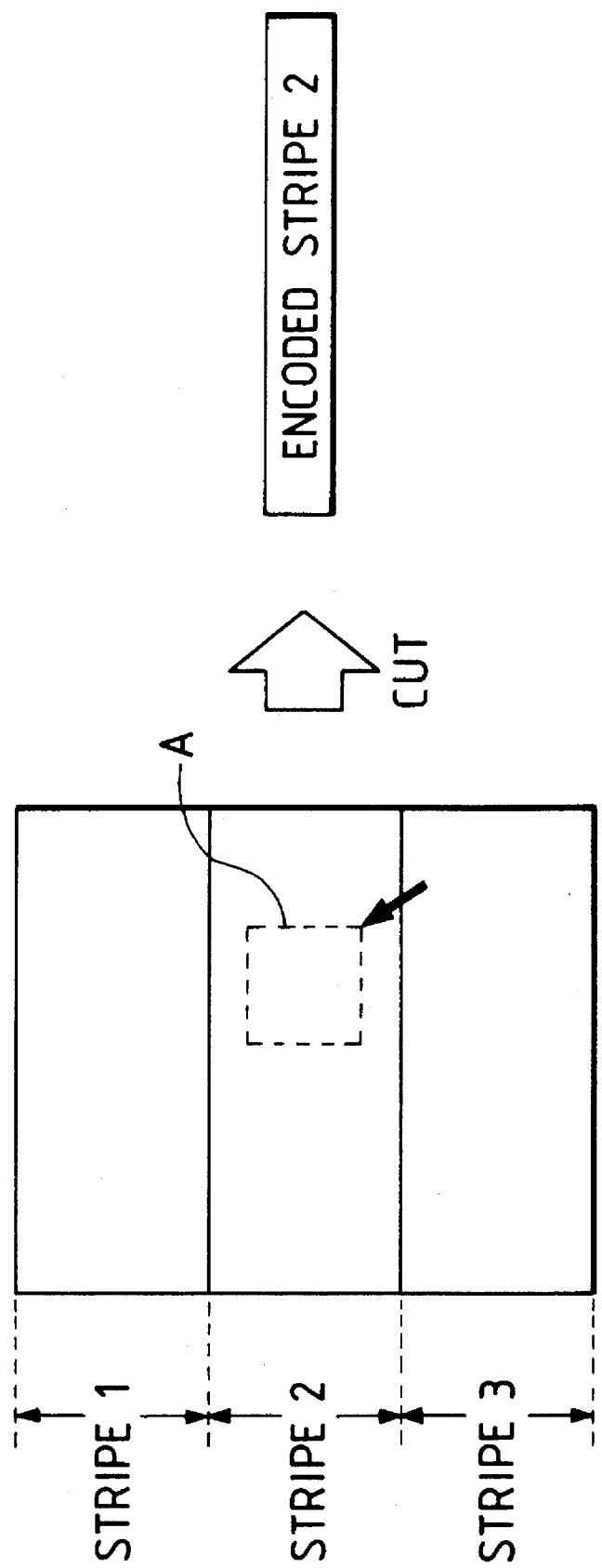
FIG. 43 is a view showing the encoding mode of a stripe alone required for the clipping.
Figure 44:
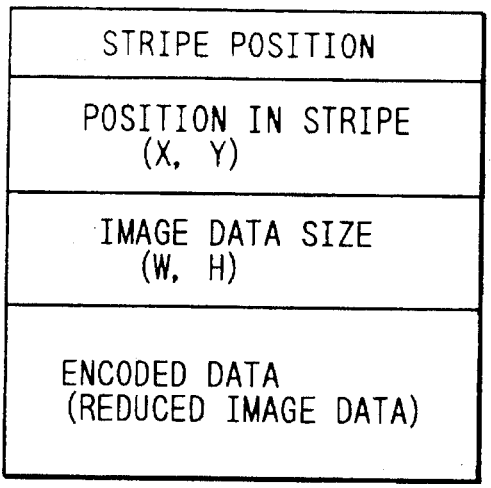
FIG. 44 is a view showing stored data relating to the clipped image data in the clipboard.

The image data (100 dpi), displayed on the CRT 5 and stored in the image memory IMEM of the main memory 2, are divided into plural stripes, as in the embodiment 8. Then, when a clipping procedure to the clipboard is initiated as shown in FIG. 42, a step S311 awaits the designation of the clipping area utilizing the image displayed on the CRT 5, and a step S312 identifies a stripe to which the image A of the designated clipping area belongs (stripe 2 in FIG. 43). Based on the result of said identification, a step S313 effects stepwise encoding on the image data (100 dpi) of the corresponding stripe in the image memory IMEM for example to a resolution of 12.5 dpi. Then a step S314 discriminates whether the encoding has been completed for all the stripes to which the image A belongs (in case of FIG. 43, the image A belongs only to the stripe 2, but it may belong to plural stripes), and the step S313 is repeated until the encoding is completed. Upon completion, a step S315 writes, with respect to all the encoded stripe data to which the image A belongs, a header (consisting of the position of the encoded stripe in the image data on the image memory IMEM, position (X, Y) of the image A in the stripe, and image data size (width W and height H), and the encoded data (containing image data of 12.5 dpi of corresponding stripe) in a predetermined area of the clipboard of the image memory IMEM in the main memory 2. Such operating mode reduces the write-in data capacity into the clipboard, thereby achieving efficient utilization of the memory.

Figure 45:
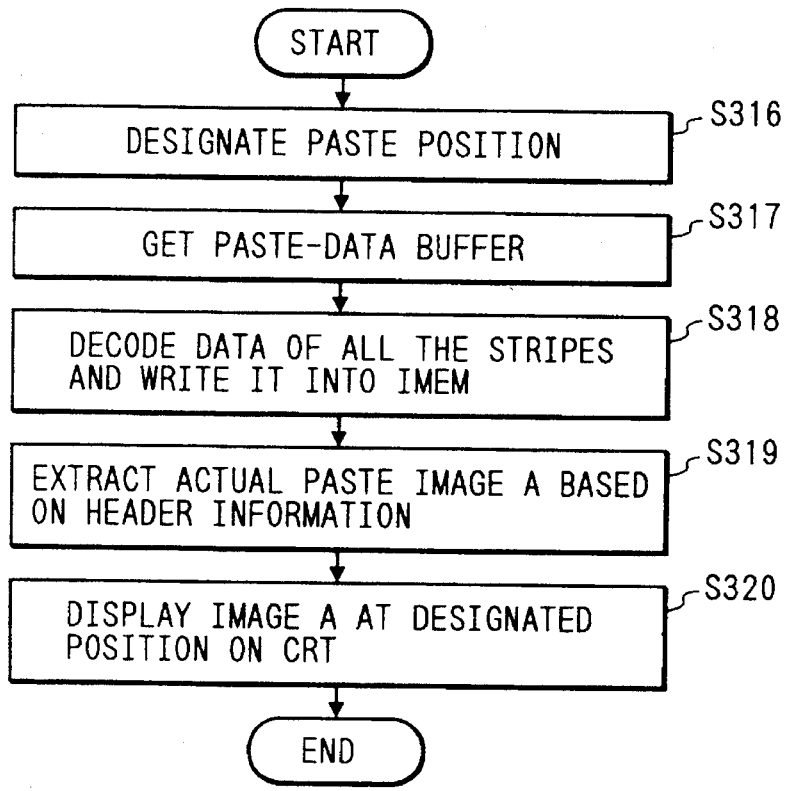
FIG. 45 is a flow chart of the pasting of the clipped image data.

In the following there will be explained the pasting of thus clipped image data A onto the image frame currently displayed on the CRT 5. When the clipboard is displayed on the CRT 5, the previously clipped image A is displayed as an icon, which is designated as an image to be pasted. Then an image to which said image A is to be pasted is displayed on the CRT 5. Then a step S316 in FIG. 45 awaits the designation of the pasting position utilizing the image displayed on the CRT 5, and a step S317 acquires a pasting data buffer in the image memory IMEM of the main memory 2. Then a step S318 decodes (100 dpi) the data of all the stripes to which the image A belongs, stored in the predetermined area of the clipboard of the image memory IMEM in the main memory 2, and stores the decoded data in the image memory IMEM, then a step S319 extracts the actually pasted image A from the image data of 100 dpi of the decoded stripes in the image memory IMEM based on the header information in the predetermined area of said clipboard and stores said image A in the buffer acquired in the step S317, and a step S320 displays the image A, extracted from said buffer, in the pasting position on the CRT 5, according to the designating information in the step S316. This procedure utilizes only the data of the necessary stripes, thereby achieving efficient utilization of the memory.

Embodiment 10

In an image processing system, which utilizes the apparatus as shown in FIG. 1 as a work station functioning as a server and in which plural work stations are connected by a network, the following operation enables efficient operation.

A system shown in FIG. 46 includes a work station WS4 functioning as a server of the structure shown in FIG. 1; work stations WS1, WS2 lacking the printer and the rigid disk; and a work station WS2 provided with a rigid disk 11A. Each of the work stations WS1–WS3 is equipped with the CRT 5, VRAM 4, CPU 1, main memory 2, I/O 3, LAN interface 7, compression/expansion circuit 8, key interface 16, keyboard 17 and mouse 19. A number 6 indicates the local area network (LAN).

In the above-explained configuration, it is assumed that the disk 11 of the work station WS4 stores the image data C+C1+C2 (FIG. 8). In case of effecting an editing operation in the work station WS1 by displaying an image corresponding to A (cf. FIG. 8) on the CRT, it is only required to transfer the data C alone from the work station WS4 to the VRAM (or main memory) of the work station WS1 through the LAN 6. Through this operation, the work station WS1 can display the image C on the CRT, and can effect editing operation by the mouse or the keyboard. The edited content H is stored in the main memory of the work station WS1. For printing thus edited image C', the edited content H alone is transferred from the main memory of WS1 to that of WS4 through the LAN 6, then the image data A are decoded in the WS4 from the data C+C1+C2 stored in the disk 11, then the edited data H are added thereto, and the edited image data A' are printed in the printer 13. Also in case of storing said image data A', said data A' are stepwise encoded to obtain C'+C1' (corresponding to C1)+C2' (corresponding to C2), which are then stored in the disk 11.

As explained in the foregoing, it is thus rendered possible to minimize the total data processing amount in the entire system, and the memory capacity required in each work station can also be minimized. The processing can be made more efficient, and the traffic in the LAN can also be maintained low.

What is claimed is:

1. An image processing apparatus comprising:

input means for entering image data;

first data memory means for storing said image data;

compression means for compressing said image data a predetermined number of times to prepare data of a predetermined resolution;

generation means for comparing data before each said compression time with data after each said compression time after each said compression by said compression means, thereby generating encoded data;

second data memory means for storing the data of said predetermined resolution and a plurality of said encoded data; and output control means for preparing data of a desired resolution from the data of predetermined resolution and the encoded data stored in said second data memory means, and supplying said prepared data to output means.

2. An image processing apparatus according to claim 1, wherein said second data memory means includes plural areas for storing data of said predetermined resolution, and plural image data entered from said input means are respectively compressed to the data of predetermined resolution by said compression means, and are respectively stored in the plural areas of said second data memory means.

3. An image processing apparatus according to claim 1, wherein said output means includes a display device.

4. An image processing apparatus according to claim 1, further comprising expansion means for expanding the data of said predetermined resolution, wherein said output means is adapted to effect the output of the data expanded by said expansion means.

5. An image processing apparatus according to claim 1, further comprising division means for dividing the data, stored in the first data memory means, into plural parts, wherein said compression means is adapted to compress a predetermined number of times the data divided by said division means.

6. An image processing apparatus comprising:

first data memory means for storing image data;

compression means for compressing said image data a predetermined number of times to prepare data of a predetermined resolution;

generation means for comparing data before each said compression time with data after each said compression time after each said compression by said compression means, thereby generating encoded data;

second data memory means for storing the data of said predetermined resolution and a plurality of said encoded data;

comparator means for comparing the size of an empty area of said second data memory means with the size of data of said predetermined resolution;

re-compression means for compressing the data of said predetermined resolution, in case said comparator means identifies that the size of the empty area of said second data memory means is smaller than the size of data of said predetermined resolution; and memory control means for storing the data, compressed by said re-compression means, in said second data memory means.

7. An image processing apparatus according to claim 6, wherein said second data memory means includes plural areas for storing the data of said predetermined resolution, and said comparator means is adapted to effect comparison with each of said plural areas.

8. An image processing apparatus comprising:

original data memory means for storing data;

compression means for compressing the data;

comparator means for comparing said data with the data compressed by said compression means;

encoded data generation means for generating encoded data, based on the result of comparison by said comparator means;

control means for activating said compression means, comparator means and encoded data generation means by a predetermined number of times in repetition;

memory means for storing, in succession, said encoded data generated under the control by said control means;

data memory means for storing data generated by the activations of said predetermined number of times of said compression means, under the control by said control means;

first display control means for displaying the data, stored in said data memory means, in a first area of display means;

instruction means for instructing the display of the data displayed in said first area, into a second display area of the display means;

expansion means for expanding the data, stored in said data memory means, according to the encoded data stored in said memory means, under the instruction by said instruction means; and second display control means for displaying the data, expanded by said expansion means, in said second display area.

9. An image processing method comprising steps of:

entering image data;

compressing the entered image data a predetermined number of times to form compressed image data;

comparing image data before compression with image data after compression;

generating encoded data based on the result of said comparison;

storing said compressed image data and the encoded data in memory means; and supplying said compressed image data to output means.

10. An image processing method comprising the steps of:

storing image data in memory means;

compressing said image data a predetermined number of times to prepare data of a predetermined resolution;

comparing data before compression with data after compression at each time of said compression, thereby generating encoded data;

storing the data of said predetermined resolution and a plurality of said encoded data in memory means;

comparing the size of the empty area of said memory means with that of the data of said predetermined resolution; and storing the data of said predetermined resolution and a plurality of said encoded data in the data memory means if the size of the empty area of said memory means is larger than that of the data of said predetermined resolution; but re-compressing the data of said predetermined resolution if the size of the empty area of said memory means is smaller than that of the data of said predetermined resolution; and storing said re-compressed data in said memory means.

11. An image processing method comprising the steps of:

storing data in original memory means;

compressing said data;

comparing said data with the data compressed by compression means;

generating encoded data based on the result of said comparison;

repeating said compression, comparison and generation of encoded data by a predetermined number of times;

storing said encoded data, generated by said repetition by a predetermined number of times, in succession in memory means;

storing compressed data, generated by said repetition by a predetermined number of times, in data memory means;

displaying the data, stored in said data memory means, in a first area of display means;

instructing the display of data displayed in said first display area into a second display area of the display means;

expanding, in response to said instruction, the data stored in said data memory means according to the encoded data stored in said memory means; and displaying said expanded data in said second display area.

* * * * *

UNITED STATES PATENT AND TRADEMARK OFFICE
CERTIFICATE OF CORRECTION

PATENT NO. : 5,500,923                                    Page 1 of 3

DATED      : March 19, 1996

INVENTOR(S): MASASHI KUROSHIMA ET AL.

It is certified that error appears in the above-identified patent and that said Letters Patent is hereby corrected as shown below:

On the title page: Item

[56] REFERENCES CITED

Line USPD, "Sakuraqi" should read --Sakuragi--.
    Line FPD, "1126073   5/1989   Japan" should read
          --1-126073   5/1989   Japan--.

COLUMN 1

Line 39, "from-the" should read --from the --.
    Line 57, ".and" should read --and--.

COLUMN 3

Line 4, "10" should be deleted.

COLUMN 8

Line 18, "10 Referring" should read --¶ Referring--.

COLUMN 9

Line 3, "transfer" should read --transfers--.
    Line 25, "is-converted" should read --is converted--.

UNITED STATES PATENT AND TRADEMARK OFFICE
CERTIFICATE OF CORRECTION

PATENT NO. : 5,500,923

DATED : March 19, 1996

INVENTOR(S): MASASHI KUROSHIMA ET AL.

It is certified that error appears in the above-identified patent and that said Letters Patent is hereby corrected as shown below:

COLUMN 10

Line 42, "same-value" should read --same value--.
    Line 58, "In-this" should read --In this--.

COLUMN 12

Line 2, "is" should read --in--.
    Line 30, "he" should read --the--.

COLUMN 13

Line 36, ".image" should read --image--.

UNITED STATES PATENT AND TRADEMARK OFFICE
CERTIFICATE OF CORRECTION

PATENT NO. : 5,500,923
DATED : March 19, 1996
INVENTOR(S) : Masashi Kuroshima et al It is certified that error appears in the above-indentified patent and that said Letters Patent is hereby corrected as shown below:

COLUMN 14

Line 41, "size/$n \leq$ compressed" should read --size/$n \geq$ compressed--.

Signed and Sealed this

Twentieth Day of August, 1996

*Attest:*

BRUCE LEHMAN

*Attesting Officer*     *Commissioner of Patents and Trademarks*